(12) United States Patent
Whelan et al.

(10) Patent No.: US 12,202,672 B2
(45) Date of Patent: Jan. 21, 2025

(54) STORAGE SYSTEMS AND METHODS

(71) Applicant: OCADO INNOVATION LIMITED, Hatfield (GB)

(72) Inventors: Matthew Whelan, Hatfield (GB); Lars Sverker Ture Lindbo, Hatfield (GB); Andrew Ingram-Tedd, Hatfield (GB); Paul Clarke, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 425 days.

(21) Appl. No.: 17/431,787

(22) PCT Filed: Feb. 19, 2020

(86) PCT No.: PCT/IB2020/000128
§ 371 (c)(1),
(2) Date: Aug. 18, 2021

(87) PCT Pub. No.: WO2020/170037
PCT Pub. Date: Aug. 27, 2020

(65) Prior Publication Data
US 2022/0135324 A1 May 5, 2022

(30) Foreign Application Priority Data
Feb. 19, 2019 (GB) .................................... 1902230

(51) Int. Cl.
*B65G 1/04* (2006.01)
*B65G 57/00* (2006.01)

(52) U.S. Cl.
CPC ......... *B65G 1/0464* (2013.01); *B65G 57/005* (2013.01); *B65G 2201/0235* (2013.01); *B65G 2207/22* (2013.01)

(58) Field of Classification Search
CPC ............... B65G 1/0464; B65G 57/005; B65G 2201/0235; B65G 2207/22; B65G 57/00;
(Continued)

(56) References Cited

U.S. PATENT DOCUMENTS

| | | | |
|---|---|---|---|
| 2,701,065 A | 2/1955 | Bertel | |
| 3,574,382 A | 4/1971 | Strauss | |

(Continued)

FOREIGN PATENT DOCUMENTS

| | | | | |
|---|---|---|---|---|
| CA | 2920669 A1 * | 2/2015 | ............. | B61B 13/00 |
| CN | 101282884 A | 10/2008 | | |

(Continued)

OTHER PUBLICATIONS

Office Action (Examination Report No. 3) issued on Sep. 11, 2023, by the Australian Patent Office in corresponding Australian Patent Application No. 2020224377. (4 pages).

(Continued)

*Primary Examiner* — Saul Rodriguez
*Assistant Examiner* — Lucia Elba Rodriguez
(74) *Attorney, Agent, or Firm* — Buchanan Ingersoll & Rooney PC

(57) ABSTRACT

A storage system is disclosed which includes a series of fire detection, suppression and extinguishing capability. The system can include containers formed as structural composites. The containers can have multiple portions of a structural or storage nature. The system can use the containers and the system itself to reduce a likelihood of fire spreading through large grid based systems.

20 Claims, 15 Drawing Sheets

(58) Field of Classification Search
CPC .. B65G 1/02; A62C 3/04; A62C 31/05; B65D 21/0209
See application file for complete search history.

(56) References Cited

U.S. PATENT DOCUMENTS

| | | | |
|---|---|---|---|
| 4,088,232 A * | 5/1978 | Lilly | B65G 1/0464 |
| | | | 414/282 |
| 5,871,857 A | 2/1999 | Alhamad | |
| 6,054,088 A | 4/2000 | Alhamad | |
| 10,435,255 B2 * | 10/2019 | Lindbo | B65G 1/0464 |
| 10,913,572 B2 * | 2/2021 | Shaikh | B65D 25/14 |
| 2008/0075569 A1 | 3/2008 | Benedict et al. | |
| 2010/0127032 A1 | 5/2010 | Schubring et al. | |
| 2013/0146602 A1 | 6/2013 | Lessard et al. | |
| 2016/0140488 A1 | 5/2016 | Lindbo | |
| 2017/0129703 A1 | 5/2017 | Lindbo et al. | |
| 2017/0252592 A1 | 9/2017 | Pigeon | |

FOREIGN PATENT DOCUMENTS

| | | | | |
|---|---|---|---|---|
| CN | 204751212 U | | 11/2015 | |
| CN | 105288903 A | * | 2/2016 | |
| CN | 106005866 A | | 10/2016 | |
| CN | 107387867 A | | 11/2017 | |
| CN | 107606173 A | * | 1/2018 | |
| CN | 207701773 U | * | 8/2018 | |
| CN | 110770146 A | | 2/2020 | |
| EP | 0767113 B1 | | 7/2002 | |
| EP | 1037828 B1 | | 9/2003 | |
| GB | 2529029 A | | 2/2016 | |
| GB | 2541055 A | | 2/2017 | |
| GB | 2541765 A | | 3/2017 | |
| GB | 2547783 A | | 8/2017 | |
| JP | H2249563 A | | 10/1990 | |
| JP | H747144 A | | 2/1995 | |
| JP | H10127810 A | | 5/1998 | |
| JP | 2001107655 A | | 4/2001 | |
| JP | 2010269833 A | | 12/2010 | |
| JP | 3167554 U | | 4/2011 | |
| JP | 2016525490 A | | 8/2016 | |
| KR | 20160020563 A | | 2/2016 | |
| NO | 317366 B1 | | 10/2004 | |
| WO | 2007031805 A1 | | 3/2007 | |
| WO | WO-2014090684 A1 | * | 6/2014 | B65G 1/0407 |
| WO | 2014203126 A1 | | 12/2014 | |
| WO | WO-2015019055 A1 | * | 2/2015 | B61B 13/00 |
| WO | 2015104263 A2 | | 7/2015 | |
| WO | 2015124610 A1 | | 8/2015 | |
| WO | 2017148963 A1 | | 9/2017 | |
| WO | 2018210952 A1 | | 11/2018 | |
| WO | 2018233886 A1 | | 12/2018 | |
| WO | 2019001816 A1 | | 1/2019 | |

OTHER PUBLICATIONS

Office Action issued on Sep. 8, 2023, by the Canadian Patent Office in corresponding Canadian Patent Application No. 3,130,443. (4 pages).
Office Action (Examination Report No. 2) issued on Jul. 10, 2023, by the Australian Patent Office in corresponding Australian Patent Application No. 2020224377. (7 pages).
Third Office Action issued on Jul. 24, 2023, by the Chinese Patent Office in corresponding Chinese Patent Application No. 202080015000.2, and a partial English Translation of the Office Action. (10 pages).
Office Action issued on Dec. 1, 2022, by the Canadian Patent Office in corresponding Canadian Patent Application No. 3,130,443. (4 pages).
Second Office Action issued on Mar. 27, 2023, by the Chinese Patent Office in corresponding Chinese Patent Application No. 202080015000.2, and an English Translation of the Office Action. (9 pages).
International Search Report (PCT/ISA/210) and Written Opinion (PCT/ISA/237) mailed on Dec. 18, 2020, by the European Patent Office as the International Searching Authority for International Application No. PCT/IB2020/000128.
Unpublished GB Patent Application No. 1314313.6, filed on Aug. 9, 2013 in the name of Ocado Limited (28 pages).
First Office Action issued on Nov. 1, 2022, by the Japanese Patent Office in corresponding Japanese Patent Application No. 2021-549102, and an English Translation of the Office Action. (15 pages)
Office Action (Examination Report No.1) issued on Sep. 19, 2022, by the Australian Patent Office in corresponding Australian Patent Application.No. 2020224377. (4 pages).
First Office Action issued on Jul. 1, 2022, by the Chinese Patent Office in corresponding Chinese Patent Application No. 202080015000.2, and an English Translation of the Office Action. (11 pages).
Final Office Action issued on May 16, 2023, by the Japanese Patent Office in corresponding Japanese Patent Application No. 2021-549102, and an English Translation of the Office Action. (10 pages).
Office Action (Request for the Submission of an Opinion) issued on Oct. 13, 2023, by the Korean Patent Office in corresponding Korean Patent Application No. 10-2021-7028006, and an English Translation of the Office Action. (13 pages).
Office Action (Decision of Dismissal of Amendment) issued on Nov. 21, 2023, by the Japanese Patent Office in corresponding Japanese Patent Application No. 2021-549102, and an English Translation of the Office Action. (5 pages).
Office Action (Decision of Rejection) issued on Nov. 12, 2023, by the Japanese Patent Office in corresponding Japanese Patent Application No. 2021-549102, and an English Translation of the Office Action. (2 pages).
Office Action (Decision of Rejection) issued on Nov. 24, 2023, by the Chinese Patent Office in corresponding Chinese Patent Application No. 202080015000.2, and a partial English Translation of the Office Action. (7 pages).
Office Action (Communication) issued on Mar. 27, 2024, by the European Patent Office in corresponding European Patent Application No. 20 723 508.6. (11 pages).

* cited by examiner

STORAGE SYSTEMS AND METHODS

The present invention relates to storage systems. More specifically but not exclusively, it relates to storage systems having storage bins in stacks, the stacks being located with a grid structure, and apparatus, systems and methods for preventing fire, suppressing fire, detecting fire and extinguishing fire in such storage systems.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above by load handling devices, removing the need for aisles between the rows and allowing more containers to be stored in a given space.

Methods of handling containers stacked in rows have been well known for decades. In some such systems, for example as described in U.S. Pat. No. 2,701,065, to Bertel comprise freestanding stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3a and 3b are schematic perspective views of a load handling device from the rear and front, respectively, and FIG. 3c is a schematic front perspective view of a load handling device lifting a bin.

A further development of load handling device is described in UK Patent Application No 1314313.6 (Ocado) where each robotic load handler only covers one grid space, thus allowing higher density of load handlers and thus higher throughput of a given size system. However, any suitable form of load handling device may be used.

In such storage systems, a large number of containers are packed in a dense manner over a large area. In the event of some form of disaster, such as a sprinkler deployment, a fire or a malfunction of the system it is necessary to shut down the whole storage system at great cost, causing disruption to the operation of any business utilising the system.

According to the invention there is provided a storage system comprising containers stacked in stacks within a framework comprising uprights the framework structure comprising: a plurality of upright members arranged to form a plurality of vertical storage locations for one or more containers to be stacked between the upright members and be guided by the upright member in a vertical direction, the plurality of upright members being interconnected at their top ends by a first set of tracks extending in a first direction and a second set of tracks extending in a second direction, the second set of grid members running transversely of the first set of grid members in a substantially horizontal plane to form a grid structure comprising a plurality of grid cells; the storage system comprising containers located in stacks in the vertical storage locations; the containers comprising a skeleton portion and a storage portion, the skeleton portion comprising means for locating the storage portion therein, the skeleton portion and the storage portion cooperating so as to form a structurally composite container.

According to the invention there is provided a storage system comprising containers stacked in stacks within a framework comprising uprights the framework structure comprising: a plurality of upright members arranged to form a plurality of vertical storage locations for one or more containers to be stacked between the upright members and be guided by the upright member in a vertical direction, the plurality of upright members being interconnected at their top ends by a first set of tracks extending in a first direction and a second set of tracks extending in a second direction, the second set of grid members running transversely of the first set of grid members in a substantially horizontal plane to form a grid structure comprising a plurality of grid cells; the storage system comprising containers located in stacks in the vertical storage locations; the containers (10) comprising pressed sheet metal.

According to the invention there is provided a storage system comprising containers stacked in stacks within a framework comprising uprights the framework structure comprising: a plurality of upright members arranged to form a plurality of vertical storage locations for one or more containers to be stacked between the upright members and be guided by the upright member in a vertical direction, the plurality of upright members being interconnected at their top ends by a first set of tracks extending in a first direction and a second set of tracks extending in a second direction, the second set of grid members running transversely of the first set of grid members in a substantially horizontal plane to form a grid structure comprising a plurality of grid cells; the storage system comprising containers located in stacks in the vertical storage locations; the upright members comprising intumescent seals such that an increase in temperature in a container within the storage system causes said seals to expand and seal said container of higher temperature.

According to the invention there is provided a storage system comprising containers stacked in stacks within a framework comprising uprights the framework structure comprising: a plurality of upright members arranged to form a plurality of vertical storage locations for one or more containers to be stacked between the upright members and be guided by the upright member in a vertical direction, the plurality of upright members being interconnected at their top ends by a first set of tracks extending in a first direction and a second set of tracks extending in a second direction, the second set of grid members running transversely of the first set of grid members in a substantially horizontal plane to form a grid structure comprising a plurality of grid cells; the storage system comprising containers located in stacks in the vertical storage locations; in which a portion of the storage locations do not comprise containers said arrangement of said portion of locations being arranged so as to form breaks in the storage system.

According to the invention there is provided a storage system comprising containers stacked in stacks within a framework comprising uprights the framework structure comprising: a plurality of upright members arranged to form a plurality of vertical storage locations for one or more containers to be stacked between the upright members and be guided by the upright member in a vertical direction, the plurality of upright members being interconnected at their top ends by a first set of tracks extending in a first direction and a second set of tracks extending in a second direction, the second set of grid members running transversely of the first set of grid members in a substantially horizontal plane to form a grid structure comprising a plurality of grid cells; the storage system comprising containers located in stacks in the vertical storage locations; the storage system further provided with a control system the control system acting so as to arrange containers within the vertical storage locations such that the arrangement of containers creates a partitioned storage system according to inventory items stored in the containers.

According to the invention there is provided a storage system comprising containers stacked in stacks within a framework comprising uprights the framework structure comprising: a plurality of upright members arranged to form a plurality of vertical storage locations for one or more containers to be stacked between the upright members and be guided by the upright member in a vertical direction, the plurality of upright members being interconnected at their top ends by a first set of tracks extending in a first direction and a second set of tracks extending in a second direction, the second set of grid members running transversely of the first set of grid members in a substantially horizontal plane to form a grid structure comprising a plurality of grid cells; the storage system comprising containers located in stacks in the vertical storage locations; the storage system further provided with deployable physical fire suppression means, said physical fire suppression means being deployed on to the uppermost surface of the storage system thereby depriving any fire of oxygen.

Advantageously, the uprights of the frame structure carry services such as power, water supply, data communications means, lighting means and sensing means throughout the frame structure.

Furthermore, the services may be directed from the uprights to the individual bins, for example water may be sprayed on to the bins from the uprights.

Moreover, the uprights may carry sensing means to detect fire, smoke, heat or gas within the frame structure.

Additionally, the uprights may comprise power supply cabling or data communications cabling such as fibre optics.

Advantageously, the substantially horizontal grid structure may be provided with collapsible walkways and/or guard rails in order to facilitate access to the sectioned area in the event of a partition deployment.

In accordance with a further aspect of the invention, the partitioning may create separate temperature zones within a given storage system.

In this way, in the event of a catastrophic failure in part of the storage system, the relevant part may be partitioned off from the remainder of the system such that the system remains safe yet operational.

In this way, the present invention overcomes the problems of the prior art and provides a system and method of increasing the reliability and reducing the overall cost of large bin handling storage systems.

The invention will now be described with reference to the accompanying diagrammatic drawings in which.

Figure 10A:
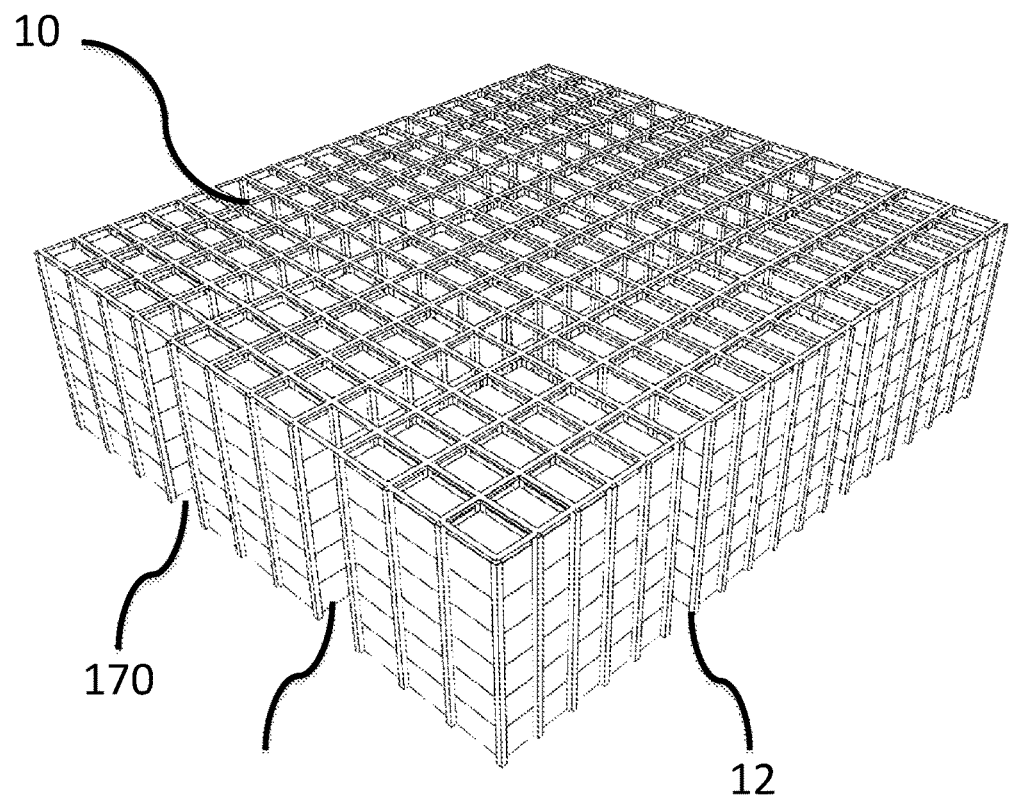
Figure 10B:
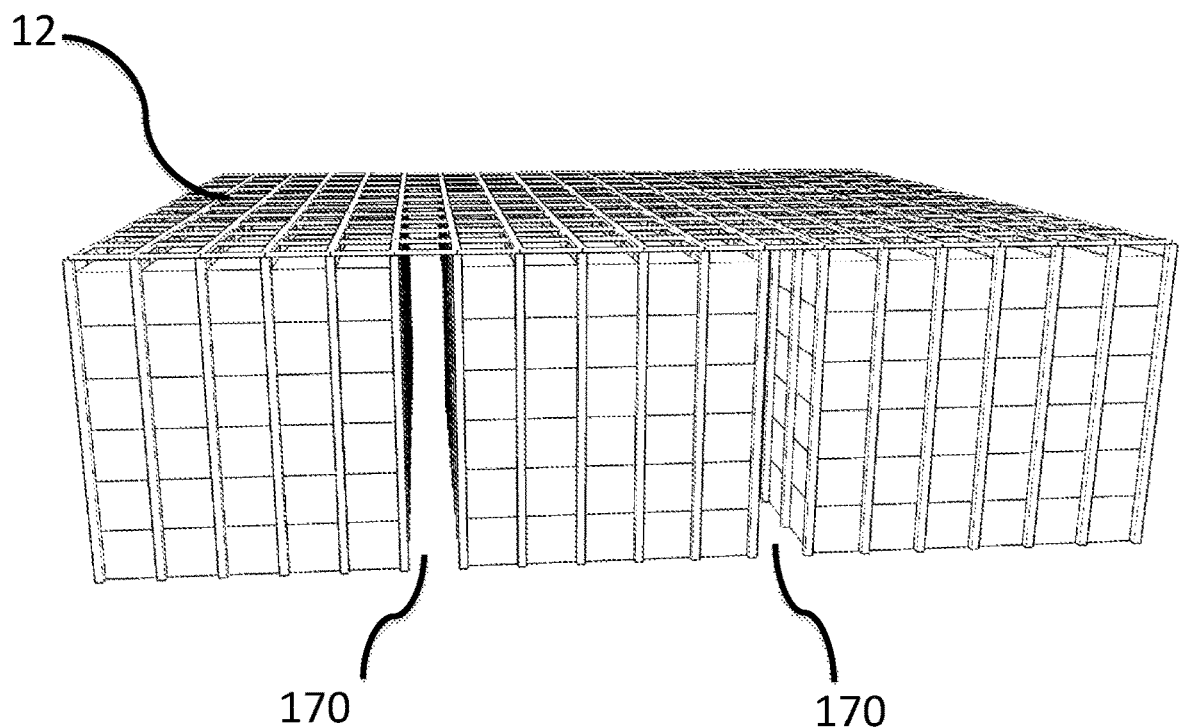
Figure 11A:
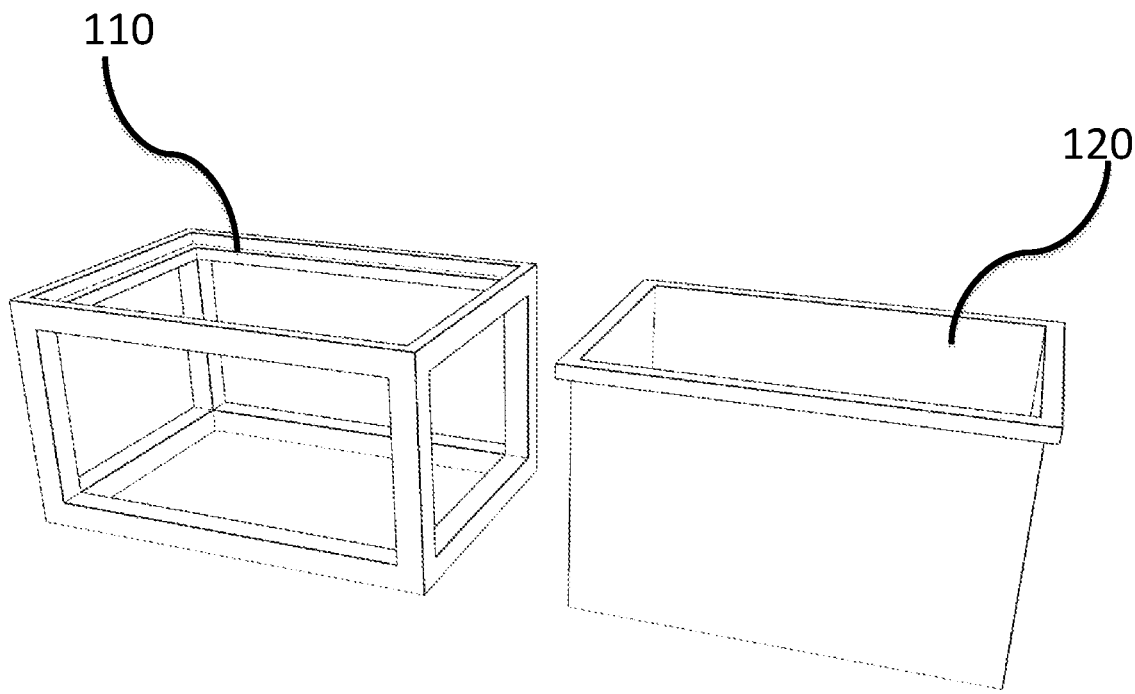
Figure 11B:
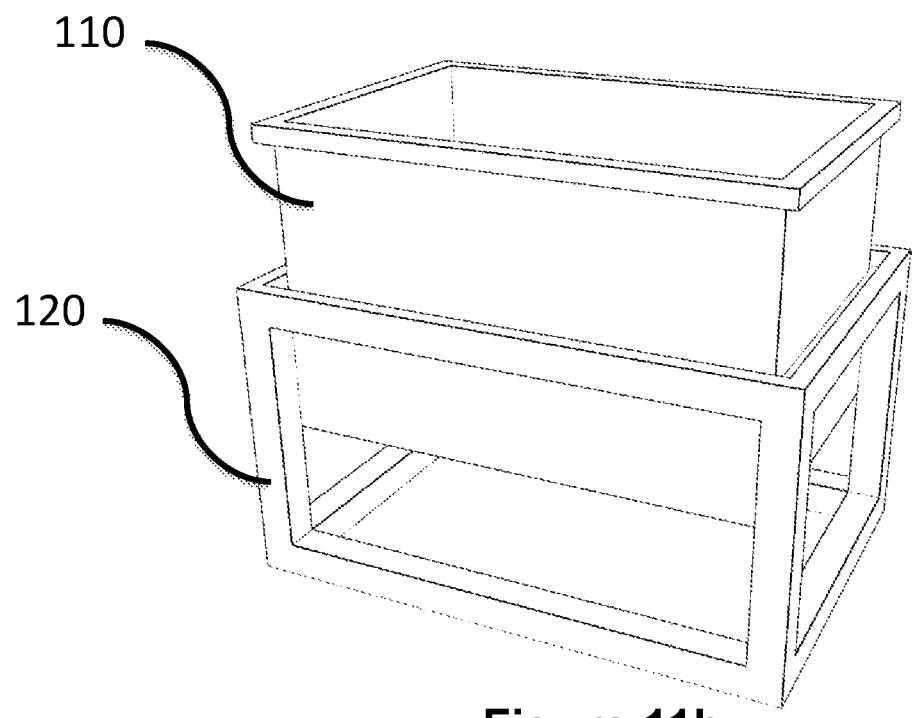
Figure 12A:
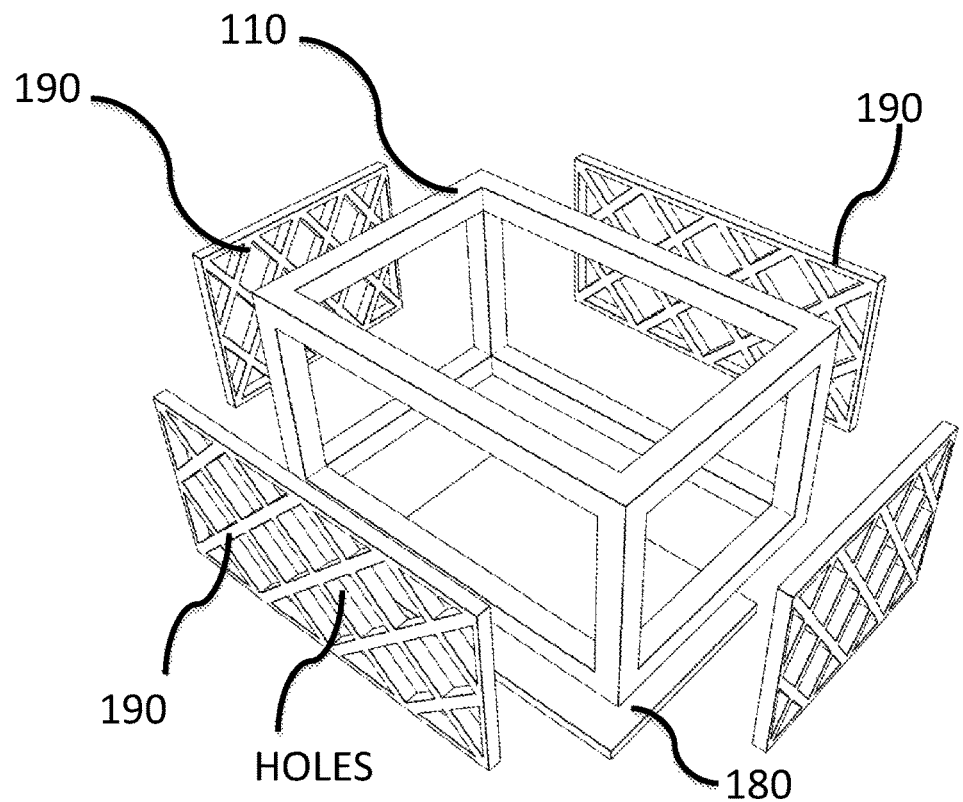
Figure 12B:
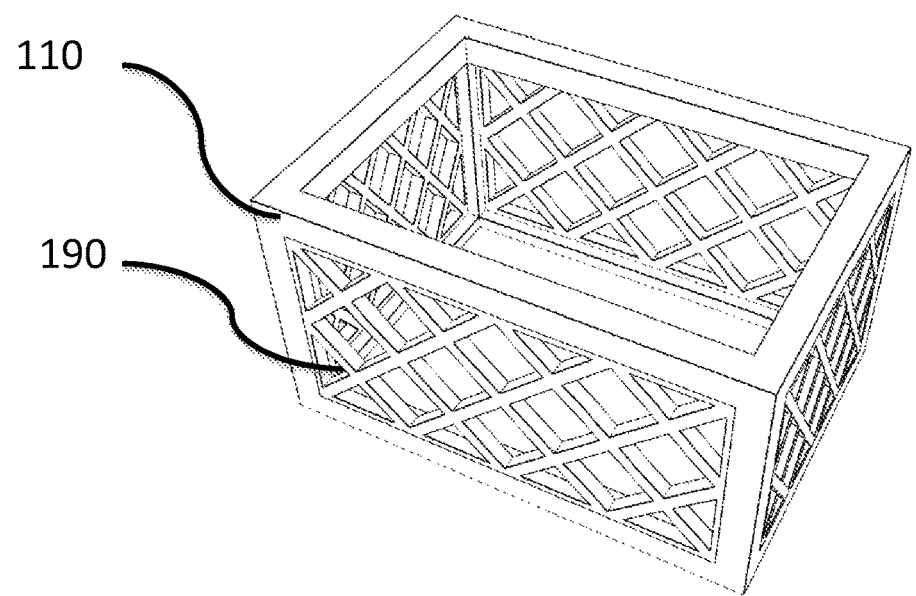
Figure 13A:
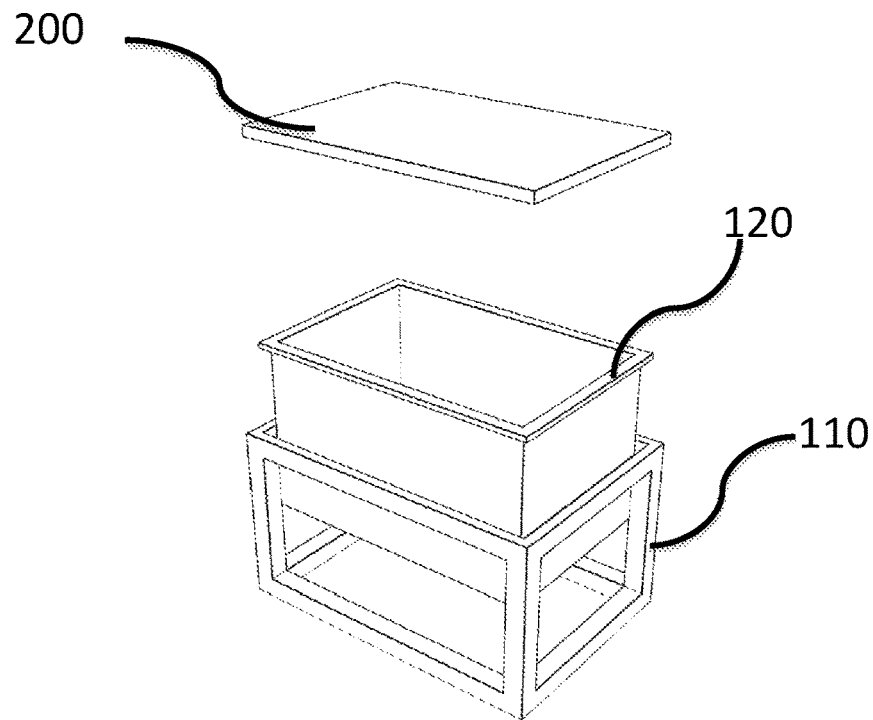
Figure 13B:
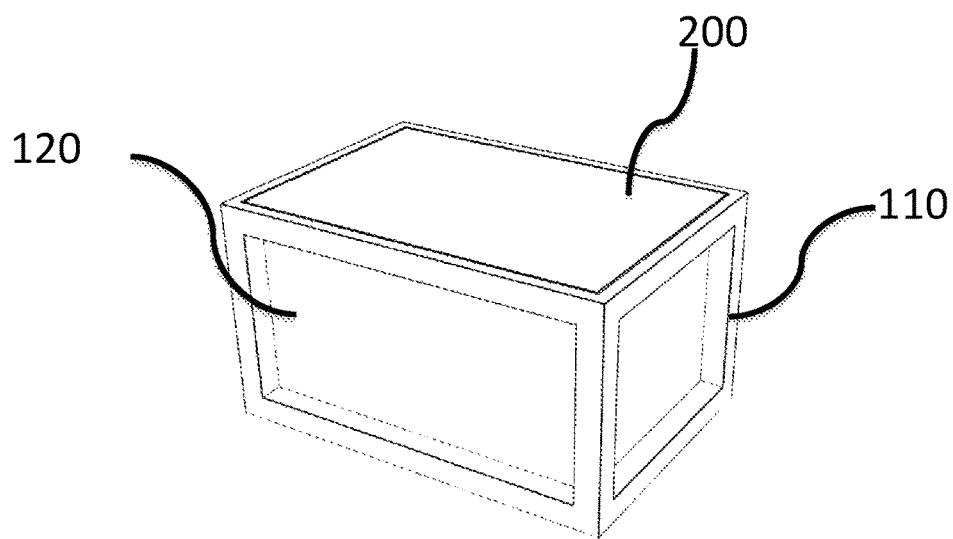
Figure 14:
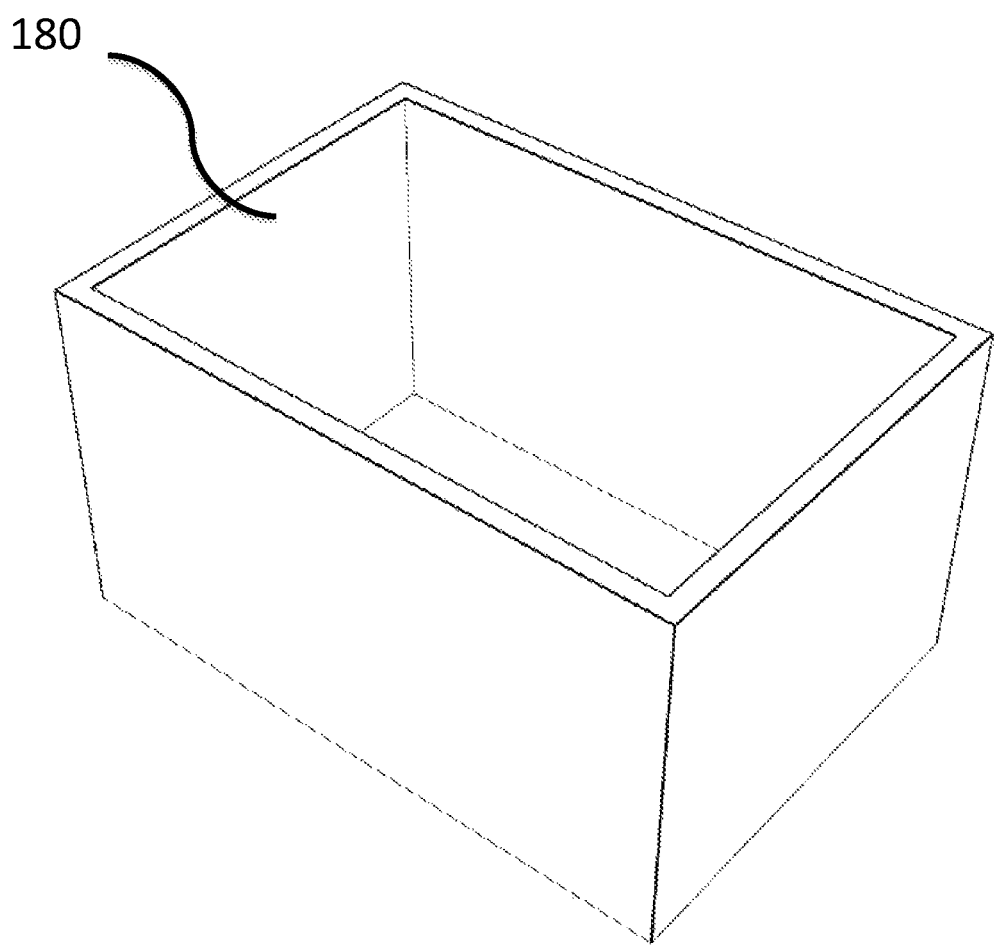
Figure 15A:
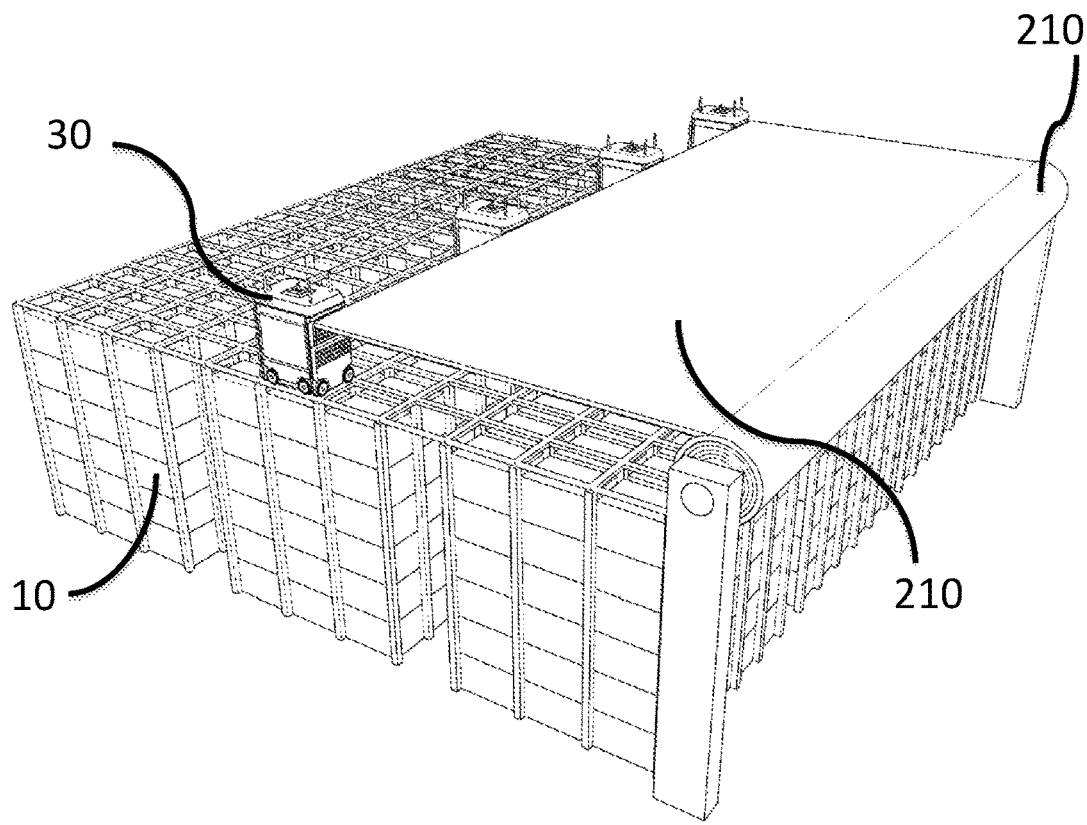
Figure 15B:
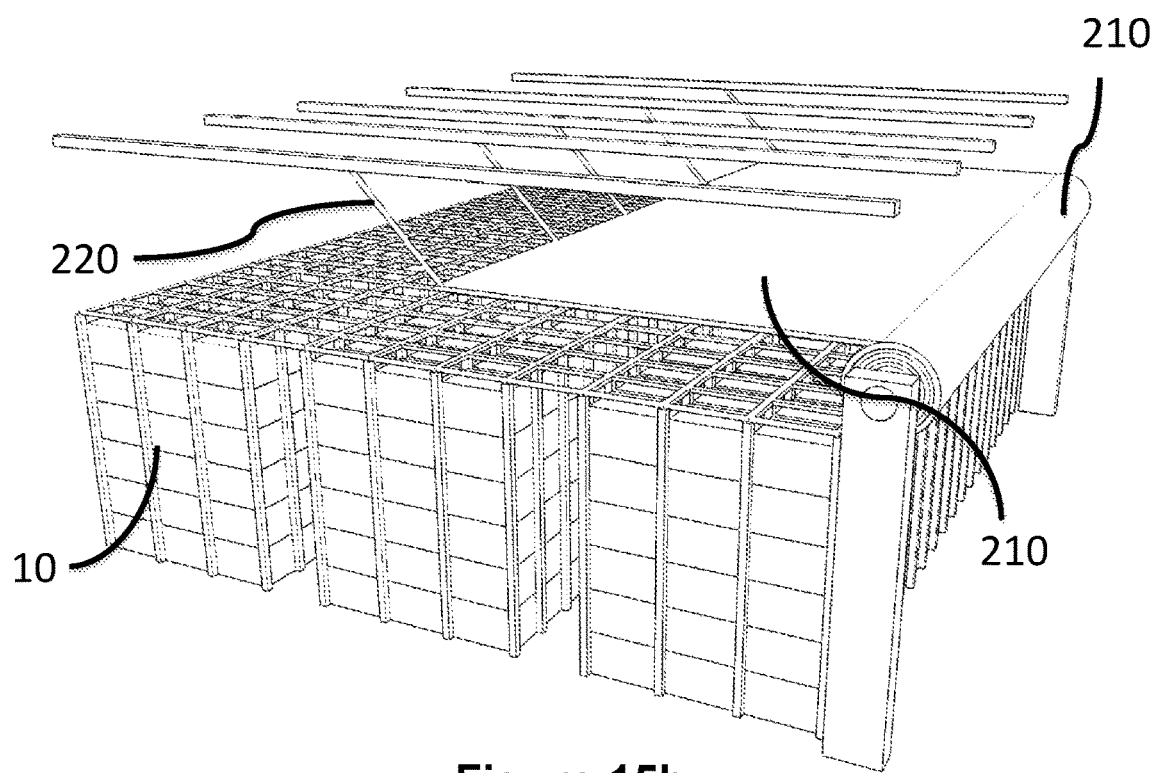

FIGS. 10a and 10b is a schematic view of a storage system comprising aisles of containers 10 stacked in stacks, a portion of the stacks 12 being removed so as to provide fire breaks;

FIGS. 11a and 11b are schematic views of one form of container in accordance with an aspect of the invention the container comprising a frame portion and a storage portion;

FIGS. 12a and 12b are schematic views of a further form of container in accordance with an aspect of the invention the container comprising mesh sides;

FIGS. 13a and 13b are schematic views of one form of container in accordance with an aspect of the invention the container comprising a lid;

FIG. 14 is a schematic view of one form of container in accordance with a further aspect of the invention the container comprising sheet metal; and FIGS. 15a and 15b are schematic views of a fire suppression system in accordance with one form of the invention, the system comprising a deployable asbestos blanket.

Figure 1:
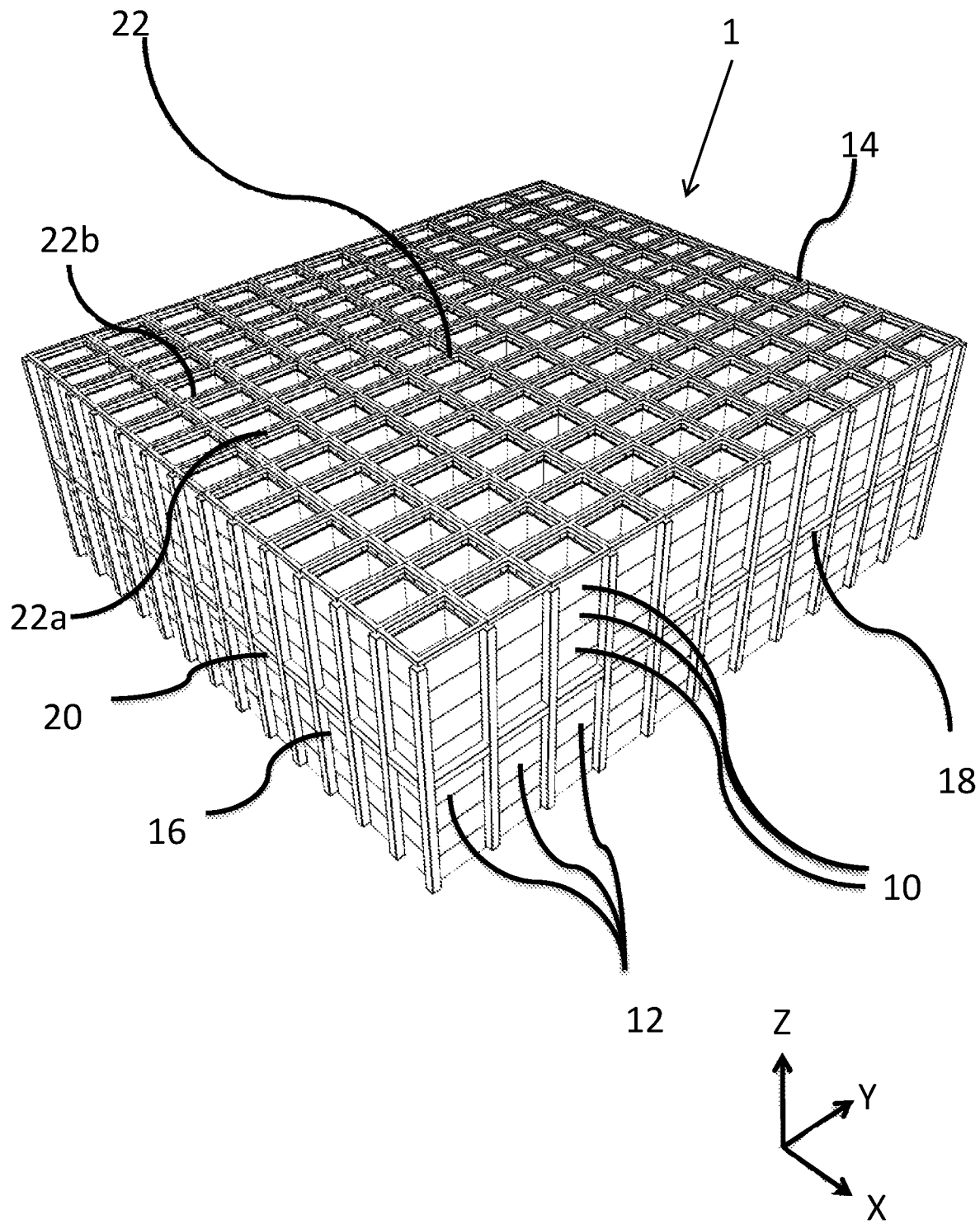
FIG. 1 is a schematic perspective view of a frame structure for housing a plurality of stacks of bins in a storage system, the system comprising a substantially horizontal grid mounted on a series of uprights, the grid and uprights together defining a framework.
Figure 2:
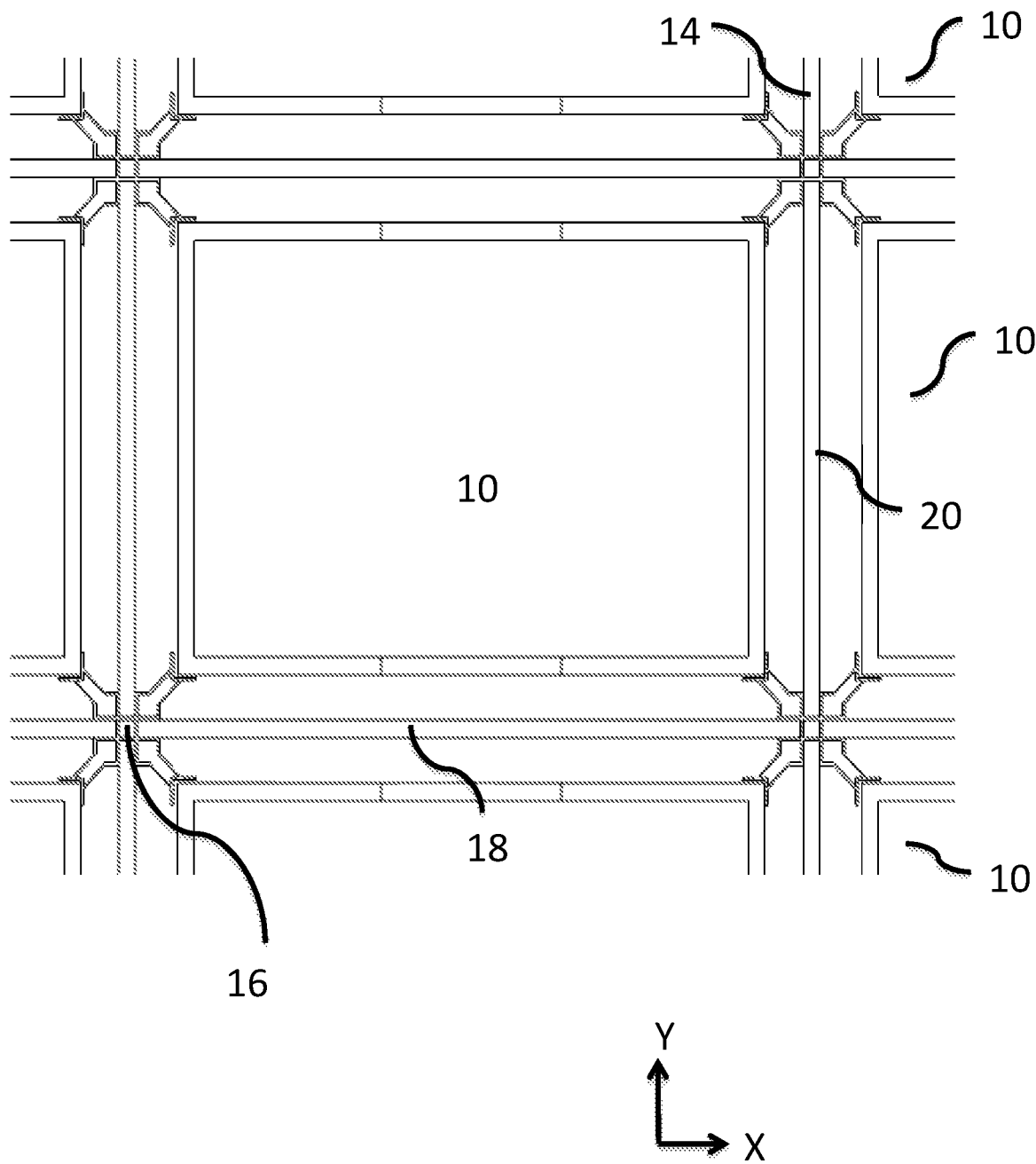
FIG. 2 is a schematic plan view of part of the grid structure of FIG. 1.

As shown in FIGS. 1 and 2, stackable containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a substantially horizontal grid structure supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 3A:
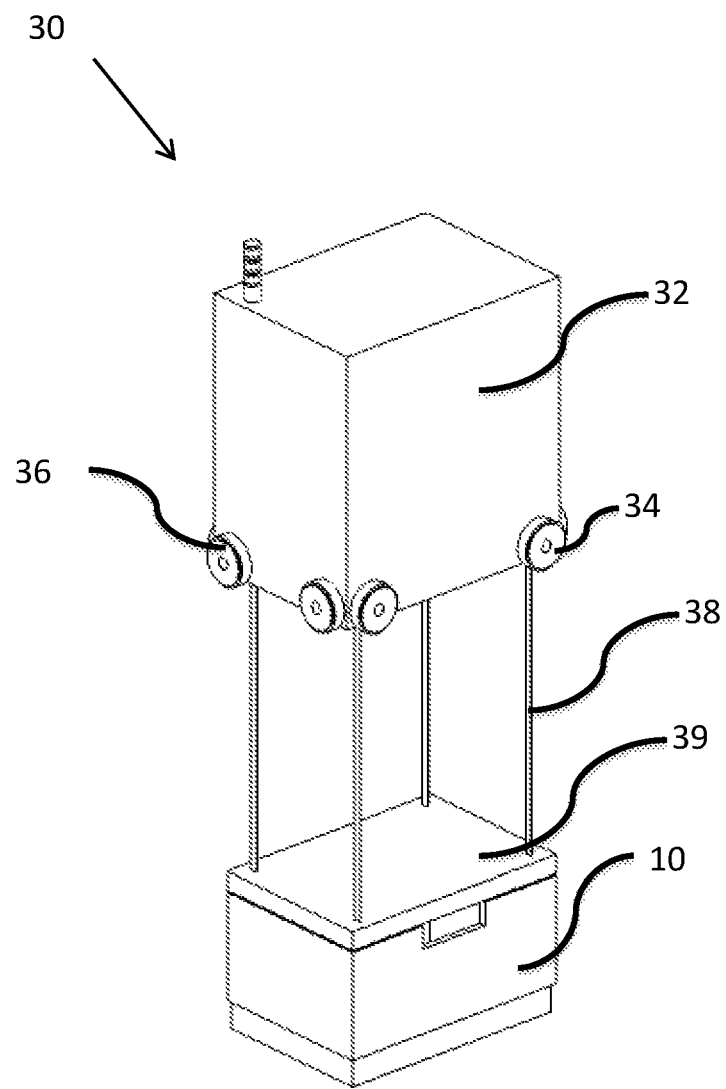
FIGS. 3a and 3b are schematic perspective views, from the rear and front respectively, of one form of robotic load handling device for use with the frame structure of FIGS. 1 and 2.
Figures 3B, 3C:
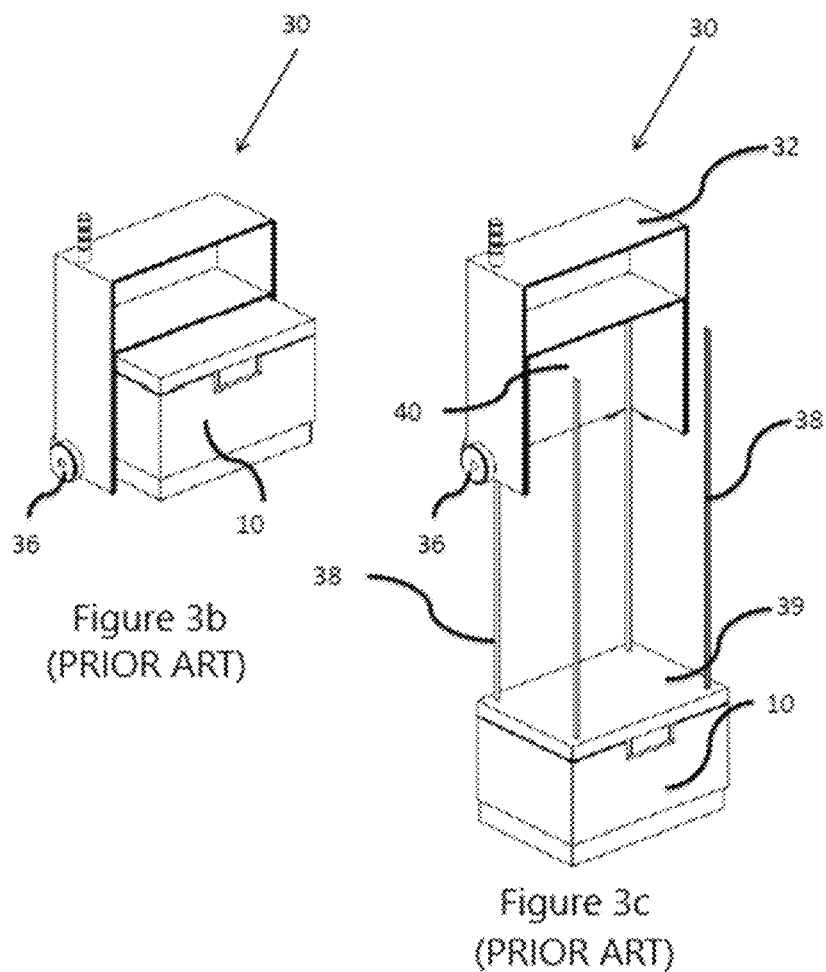
FIG. 3c is a schematic perspective view of the known load handler device in use lifting a bin.
Figure 4:
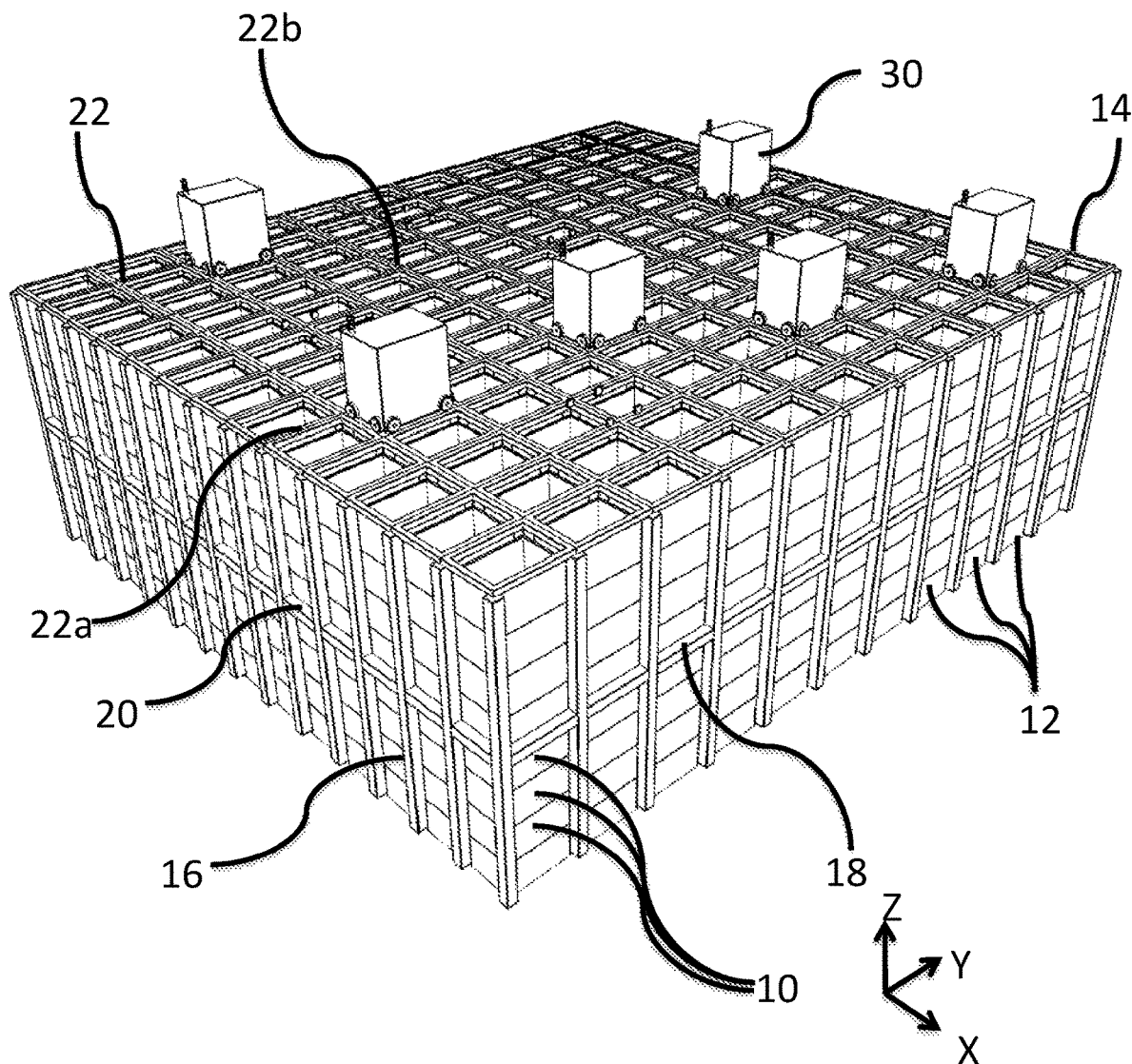
FIG. 4 is a schematic perspective view of a known storage system comprising a plurality of load handler devices of the type shown in FIGS. 3a, 3b and 3c, installed on the frame structure of FIGS. 1 and 2, together with a robotic service device in accordance with one form of the invention.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12.

FIGS. 1 and 4 show the bins 10 in stacks 12 within the storage system. It will be appreciated that there may be a large number of containers 10 in any given storage system and that many different goods may be stored in the stacks, each container 10 may contain different goods within a single stack. Furthermore, it will be appreciated that the containers may be empty whilst stored in the stacks or may contain items such as parcels or other items for future delivery.

Figure 5A:
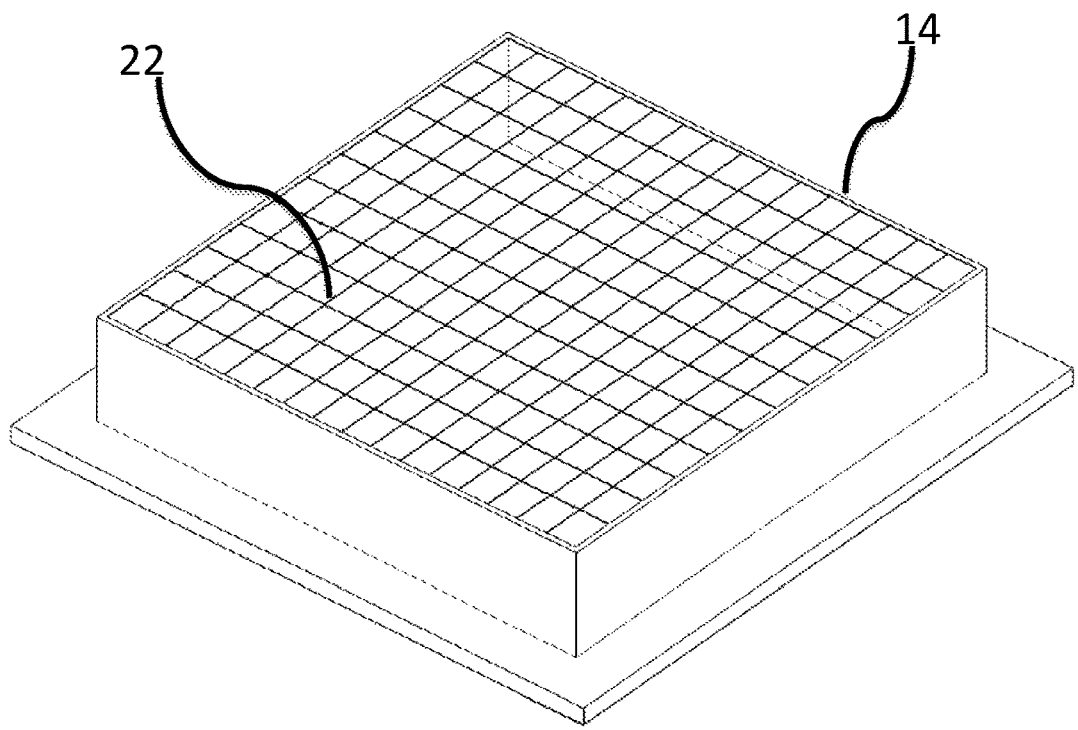
FIG. 5a is a schematic perspective view of the known storage system of FIGS. 1 and 4 with the detail of the uprights and the load handling devices removed for clarity.

FIG. 5a shows a simplified schematic diagram of a grid structure such as the one shown in FIG. 1. The framework 14 is depicted without showing the individual uprights 16.

Storage System Partitioning

Figure 5B:
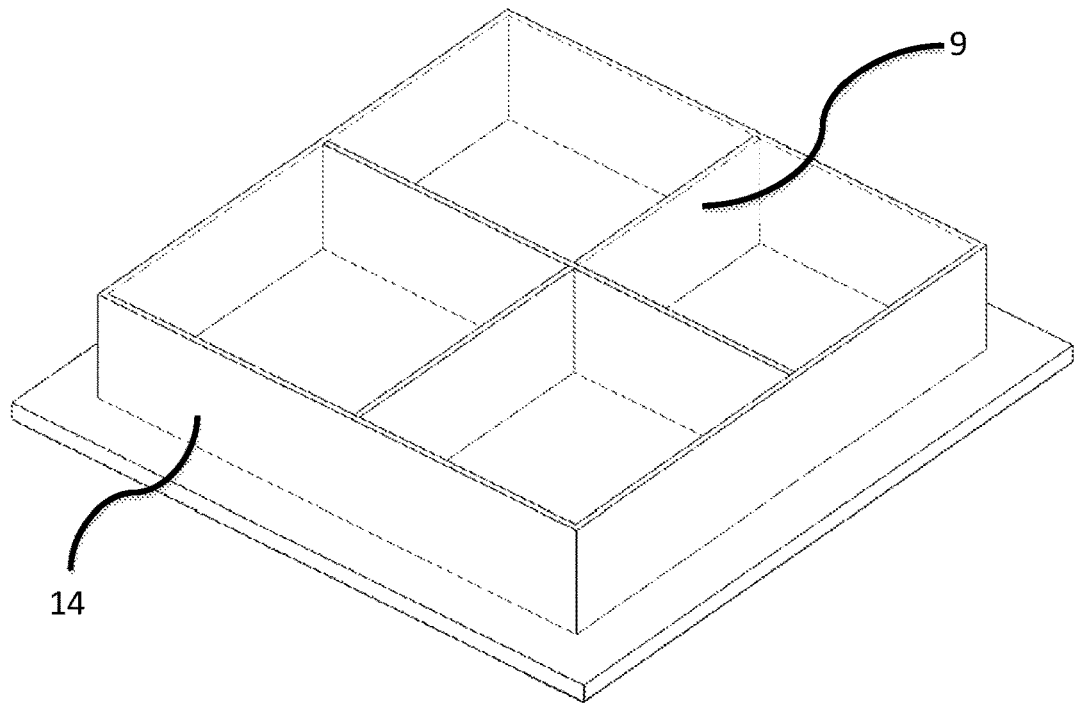
FIG. 5b is a schematic perspective view of the storage system of FIG. 1 in accordance with one aspect of the invention, the system further comprising partitions disposed beneath the grid structure, the representation of the grid structure being removed for clarity.

As shown in FIG. 5b the storage system may be partitioned by dividers 19. In FIG. 5b, the representation of the grid 22 has been removed to improve the clarity of the Figures. Additionally, the framework 14 has been depicted without the individual uprights 16 for clarity. It should be appreciated that the sides of the framework comprise uprights 16 as shown in FIG. 1. The dividers 19 act so as to section off the storage system. The grid may be sub-divided into smaller sections, with solid dividers 19 up to a level below the top of the grid. The dividers 19 may be formed from steel, aluminium or any other material suitable for dividing the storage system.

It will be appreciated that in accordance with an aspect of the invention, the system may be partitioned by suitable partitioning means into smaller sub sections defined by, for example temperature. In this way it would be possible to have an ambient portion, a chilled portion and a frozen portion for example. It will also be appreciated that the partitioning may have additional advantages, for example, partitioning enables sections of the storage system to be isolated from other sections. This may be necessary, as described above, if there is a fire, for example, and fire suppressant means are used in a given area to extinguish the fire. Furthermore, in the case where the system is used for alternative uses, there may be advantages in having different gaseous atmospheres in different portions of the system. This again may be achieved by partitioning the system. It will be appreciated that the partitioning means may be temporary and remotely deployable, for example roller shutters disposed under the grid.

It will further be appreciated that the partitions may take the form of fixed partitions such as fixed wall structures formed from, for example concrete or thick gypsum wall or thinner gypsum board that may be retrofitted to existing systems in the gaps between the stacks 12 of containers 10.

In use, the load handling devices 30 are operable on the top surface of the grid and act to raise and lower containers 10 from the stacks 12 of containers 10 in the storage system.

In storage systems of this type, inevitably there are items that require storage that may be ignitable or constitute a fire risk, for example matches or fireworks. In a large storage system containing numerous stacks 12 of containers 10 this may pose a significant fire risk, particularly if the containers 10 are packed in a dense fashion. Accordingly, such systems are provided with sprinkler systems which when deployed can extinguish any fire but can cause significant damage and disruption to the whole system.

Sprinkler Systems and Partitioning

In a conventional warehouse situation, sprinklers may be deployed from the roof of the warehouse. In a storage system as described herein, this may cover a large area and could be above the level of the grid. Such a sprinkler deployment could severely damage load handling devices 30 as well as causing damage across a large area of the system resulting in costly shut down and replenishment of goods. Restricting the sprinkler deployment to the area beneath the grid 22 and the load handling devices 30 may prevent costly damage.

In a first embodiment of the invention, dividers 19 are disposed within the framework structure 14. The dividers 19 comprise a solid, fixed installation extending from the floor of the storage system upwardly to a level substantially just below the level of the grid of the framework 14. In this way, the movement of the load handling devices 30 on the grid is not inhibited by the dividers 19.

Sprinkler means are positioned such that, in the event of a fire, water from the sprinkler system will only fall in the section of the storage system affected. In one aspect of the invention, the storage system is provided with manually activatable sprinkler systems such that on detection of a fire within the system, an external manual input can cause the sprinkler system to activate rather than relying on the system activating once the temperature at the sprinkler head is elevated.

The dividers 19 will prevent water from spreading to portions of the storage system not affected by the fire. In this way any discharged water would stay in one compartment of the storage system, where it would help in cooling and/or extinguishing the fire. Any water damage would not spread to other compartments, thereby limiting the total scope of the damage. The space around the solid dividers 9 could also be used to allow for installing pipes for a slow and controlled drainage of the water after a sprinkler release.

It will be appreciated that, in the event of a sprinkler activation, the robotic load handling devices 30 may be routed away from or around the affected area.

The presence of the dividers 19 restricts whatever material is released in the locale of the fire thereby preserving goods, objects, inventory items and anything else that may be contained within the containers 10.

Figure 6:
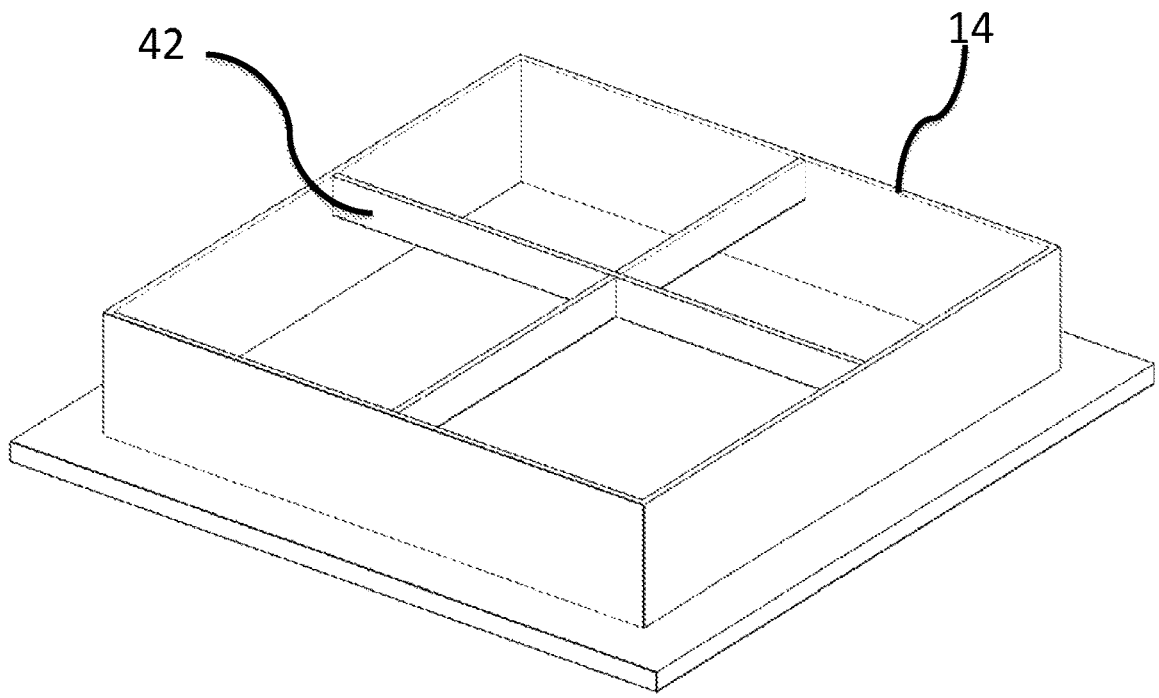
FIG. 6 is a schematic view of the storage system of FIG. 5a in accordance with one aspect of the invention showing deployable partitions, partially deployed, the partitions being mounted on the underside of the grid structure, the representation of the grid structure being removed for clarity.

As shown in FIG. 6, in a further embodiment of the invention, an alternative form of dividers are shown. The dividers 42 of the second embodiment of the invention are releasably deployable from the underside of the grid 22. The dividers 42 may comprise openable and closeable shutter systems to enable a more flexible partitioning system. The dividers 42 may be mounted on the underside of the grid 22 and be deployed only in the event of a fire being detected.

Alternatively, the deployable partitions may be deployed in response to a requirement to cool or heat part of the storage system.

The partitioning means 42 may, for example, take the form of roller shutters deployable in response to a predetermined signal indicating a requirement to partition a part of the system.

Sectioning off parts of the storage system enables properties of the system to be more easily monitored and controlled.

Figure 7:
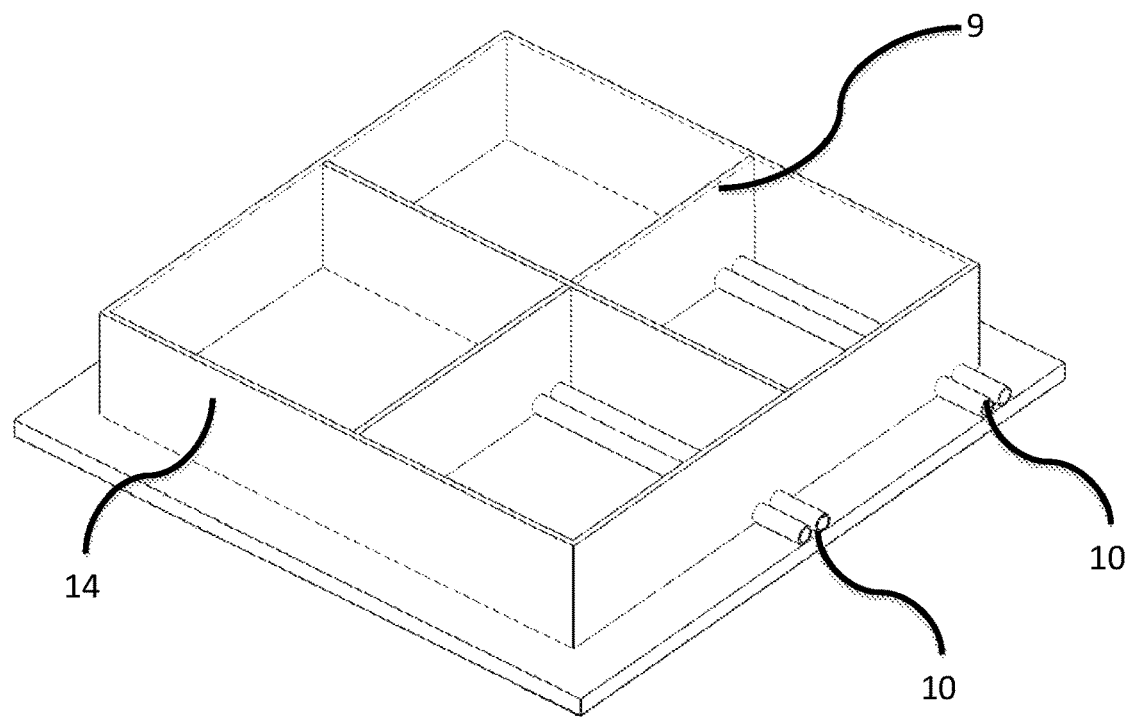
FIG. 7 is a schematic view of the storage system of FIG. 5 in accordance with one form of the invention, the structure additionally comprising drainage pipes to enable drainage of fluid in the event of a sprinkler deployment.

As shown in FIG. 7, it is possible to incorporate draining means 110 in to the various subsections of the system in order to facilitate drainage of any fluids deployed via a sprinkler activation. It will be appreciated that the drainage means may be incorporated in systems having permanent dividers 19, deployable partitions 42 or both.

It will be appreciated that including the partitioning, whether deployable or permanent, does not seal the section of the storage system from the rest of the storage system, the robotic load handling devices require access the containers in the stacks. Therefore, to completely section off a stack 12 or a number of stacks requires the grid spacing 22 at the top of the stack 12 to be sealed off. This may be achieved in a number of ways, for example, a load handling device may be deployed to top the stack 12, a robotic load handling device may be deployed to fix a lid on the top of the stack, or number of stacks 12, a number of robotic load handling devices may be used together to top a number of stacks 12. Alternatively, further deployable shutter means 42 may be located under the grid structure 22 to be horizontally deployed across a stack 12 or a number of stacks.

It will be appreciated that there are a number of ways both mechanically and via the robotic load handling devices 30 that this may be achieved.

It will be appreciated that the partitioning of the system may have additional advantages, for example, partitioning enables sections of the storage system to be isolated from other sections. Different portions of the system can be maintained at different temperatures. Furthermore, there may be advantages in having different gaseous atmospheres in different portions of the system to suppress and prevent spreading of any fire. This may be achieved by partitioning the system. Partitioning the system has the advantage of enabling only a portion of the inventory to be affected by any fire.

Figure 8:
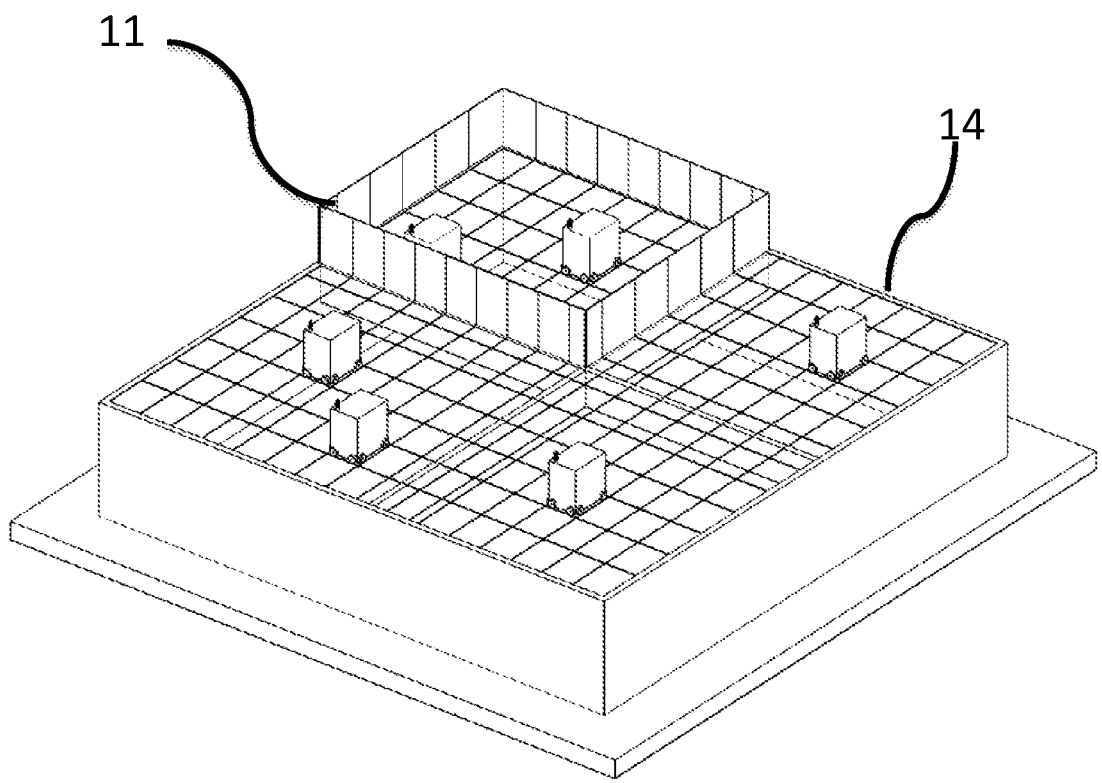
FIG. 8 is a schematic view of the storage system in accordance with a further aspect of the invention, the grid structure supporting safety barriers thereon.

In yet another aspect of the invention, as shown in FIG. 8, the space above the divider 9 may be equipped with guard rails 111, which may be individually raised or required. In use, the guard rails 111 would be raised to prevent the load handling devices 30 from travelling from one section of the storage system to another. This is especially useful after the release of sprinklers, when a given section of the storage system may need to be dried or cleaned. It will be appreciated that it would also be useful in the case of mechanical failures of load handling devices, or other parts of the system, requiring a person to be sent onto the grid to perform repairs. Using this method, only a small part of the grid needs to be closed down during recovery.

Figure 9A:
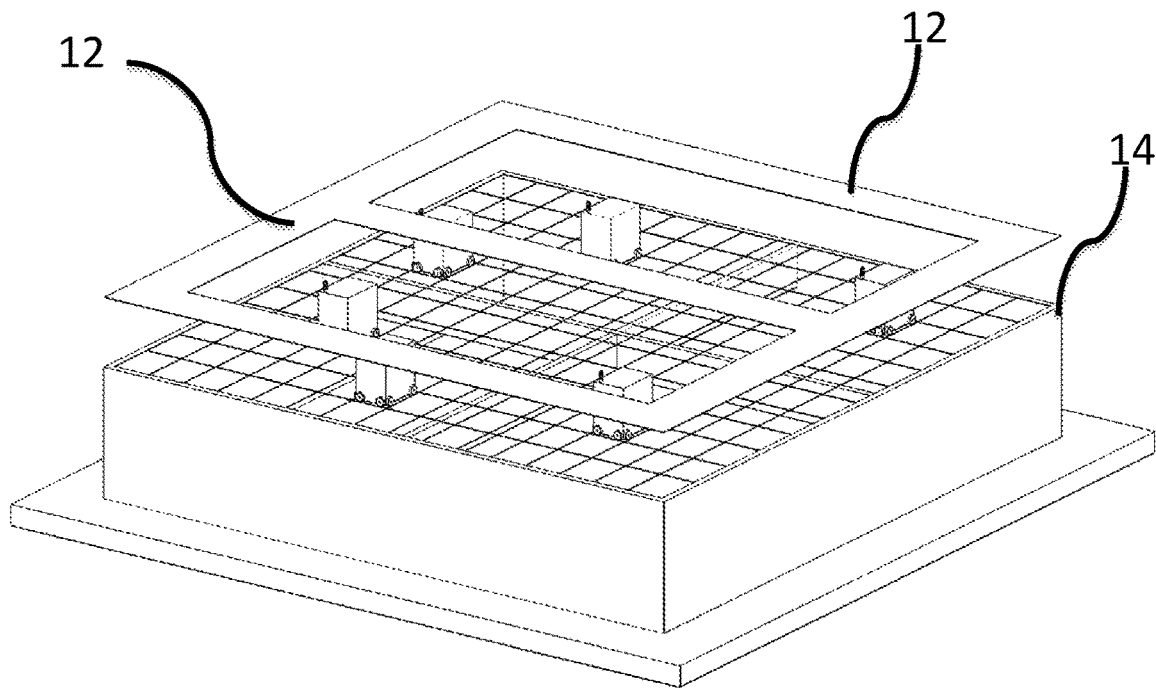
FIG. 9a is a schematic view of the storage system in accordance with a further aspect of the invention, the system comprising walkways suspended above the grid.

In further embodiment of the invention, as shown in FIG. 9a, walkways 112 could be installed above the solid dividers 19 to serve both to provide pedestrian access to all sections of the grid and to provide a structure from where the above-mentioned guard rails 112 can be lowered. The walkways 112 may also hold planks or similar which can be put on the grid 22, when it is cordoned off, to allow safe and effective pedestrian access to any malfunctioning equipment anywhere on the grid 22 or access to a section of the system in which manual fire extinguishing was required. It will be appreciated that the walkways may be permanently suspended from the ceiling or any structural part of the building containing the storage system.

Figure 9B:
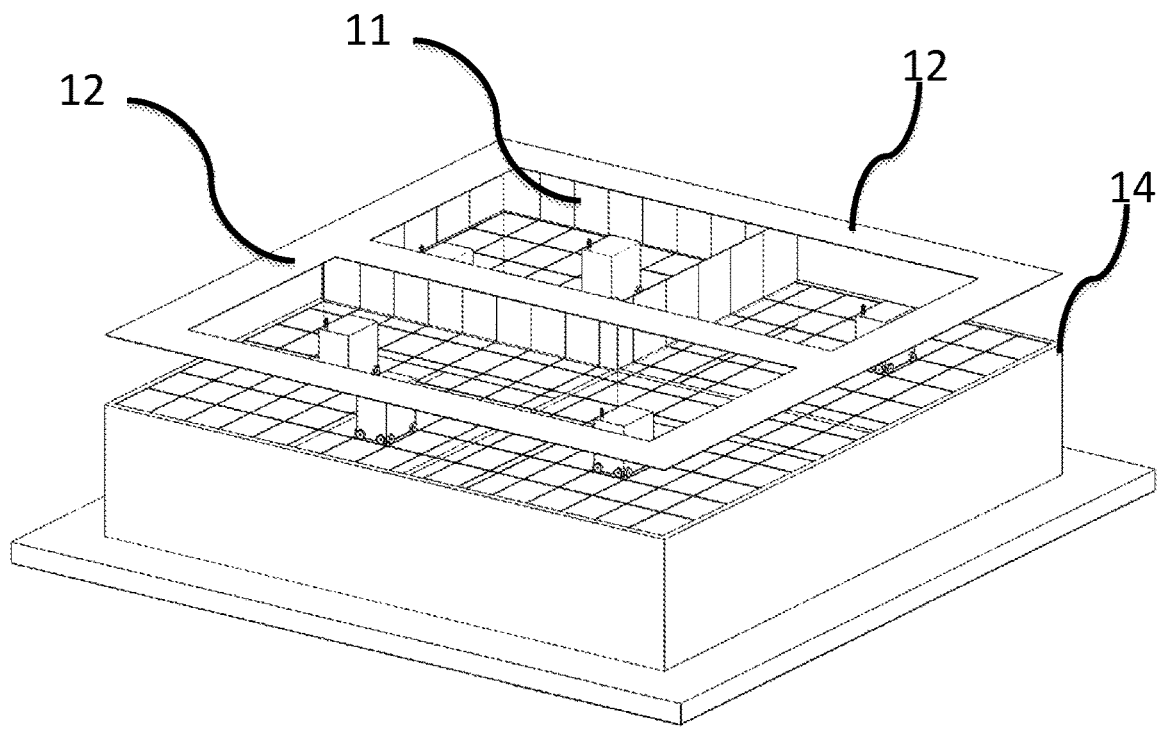
FIG. 9b is a schematic view of the frame structure of FIG. 9a in accordance with a further aspect of the invention, the walkways of FIG. 9a comprising safety barriers suspended therefrom.

FIG. 9b shows and alternative form of safety barrier 111. In this embodiment, the safety barrier 111 is deployable from the underside of the walkway 112. In this way, the substantially horizontal grid 22 is not compromised and no complicated deployment mechanism is required.

It will be appreciated that the partitioning of the storage system in combination with the use of fire retardant totes and totes in accordance with the invention described above may have additional advantages, for example, partitioning enables sections of the storage system to be isolated from other sections. This may be necessary if there is a fire, for example, and fire suppressant means are used in a given area to extinguish the fire. Furthermore, in the case where the system is used for alternative uses, there may be advantages in having different gaseous atmospheres in different portions of the system. This may be achieved by partitioning the system. It will be appreciated that the partitioning means may be temporary and remotely deployable, for example roller shutters disposed under the grid.

Fire Detection and Suppression Systems in the Structure of the Storage System

When the storage system is in use, the load handling devices 30 are operative on the grid portion 22 of the frame structure. The load handling devices move laterally above the stacks 12 of containers 10. The uprights 16 of the frame structure are supporting the load handling devices above the stacks 12. A load handling device 30, under the control of computer means, may raise a container 10 from a stack 12 and carry said container 10 to a pick station, not shown, for an item to be removed from the container. Furthermore, load handling devices 30 act so as to place containers 10 in stacks 12 within the storage system for storage of inventory items or other items within the storage system.

It will be appreciated that the uprights 16 of the framework 14, may be provided with service means routed within the contours of the beams, around the storage system. Such services may comprise power, sensor systems, system control means or any other service that may be required within the framework of the storage system. For example, one specific example of a service supplied around the storage system is the routing of fluid supply means. The fluid supplied from the fluid supply means may be, for example, water in the manner of a sprinkler system to be deployed in the event of a fire.

UK Patent Publication No GB2541055 A to Ocado Innovation Limited, hereby incorporated by reference, details a system and method by which services and utilities may be transmitted and supplied round a framework of the nature described above.

Such services are routed around the framework via suitable cables or pipes. The cables and pipes may be mounted on the external surfaces of the uprights or on the underside of the substantially horizontal grid structure. Alternatively, the framework may be manufactured to enable routing of cables and pipework within the structure of the extrusions comprising the grid and the uprights 16.

UK Patent Publication No GB2541765 A entitled Plant Growing Systems and Methods filed on 13 Oct. 2015 by Ocado Innovation Limited, hereby incorporated by reference, details a system and method for growing plants in a storage system as described above. In particular, a fluid supply system described therein may comprise gas such as $CO_2$, as used in greenhouse applications or $N_2$ used as a fire suppressant.

Fire, smoke and temperature sensors may be disposed within the framework 14, such sensors being monitored by suitable monitoring means such that in the event of a trigger from one or more of these sensors the sprinklers may be remotely activated, to extinguish the fire or reduce the temperature.

Other sensor means that may be mounted on the framework structure may include camera means such as, but not limited to, CCD cameras. Cameras mounted on the uprights may be used to monitor the system whilst in use, the images being transmitted either wirelessly or via suitable communications means, to a remote monitoring system. The camera means may be used to inspect the system, for example thermal imaging may be used to detect hot spots within the system, any hot spot remotely triggering a sprinkler to be operated.

It will be appreciated that the sensors described above, and others not explicitly described, may all require power supplies, power control and means for transmitting sensor outputs to central data logging means via suitable communications means.

It will be appreciated that any type and method of communication may be used, for example WiFi, Bluetooth, 3-wire serial, SigFox or other proprietary systems such as that described in UK Patent Application No. GB1509793.4 to Ocado Innovation Limited, the contents of which in hereby incorporated by reference. It will be appreciated that any other suitable communications means or protocol may be used.

It will be appreciated that cameras may be used in conjunction with other sensors to enable remote visual inspection of the storage system should one of the other sensor systems be triggered due to a fault in the framework.

In this way, the structural and environmental condition of the storage system may be monitored continuously whilst the storage system is in use.

The uprights 16 and the framework 14 may be used to carry services that may be required by other aspects of the system. For example, power may be transmitted along suitable cables routed on the framework structure 14.

However, it will be appreciated that non contacting methods of transmitting the required power to individual containers 10 and sensors mounted on the framework 14 may be used, for example magnetic induction or RF induction. In this way, power is supplied to the service means in individual containers 10 or to sensors and sensor systems without the need for the container 10 or the sensor to be in contact with the upright 16. The uprights 16 are located adjacent the corners of the containers 10 and each upright 16 has guiderails for the corners of the container. It will be appreciated that there will be some tolerance between the guiderails and the containers 10, for example approximately 5 mm in the case of a grid for storage and retrieval of inventory items in an order fulfilment centre.

For example, certain containers 10 may contain ignitable products such as matches. In the event that the matches ignite, sensors within the framework would detect the heat, fire or smoke, and a visual inspection via a camera may identify an individual container 10. Water may be directed in to that individual container 10. In this way, a fire may be contained within a single container 10 or a few containers.

In all of the above, it will be appreciated that a sprinkler system need not be limited to spraying water. The sprinkler system may spray powder or may release gas, for example N2, acting as a fire suppressant. It will be appreciated that the sprinkler system may release other gases, for example CO2.

Other fire suppressant means utilise gases such as nitrogen to starve any fire of oxygen. In the event of a gas deployment, again this could be directed at individual containers 10 but may also be in the vicinity of a stack 12 or a number of stacks 12.

In another embodiment, the framework may comprise fire suppressant foam that may be ejected on detection of a fire by sensors within the storage system thereby preventing the spread of any fire.

In a further embodiment, the uprights within the storage system comprise intumescent seals. If the temperature of a container (10) rises in the vicinity of such a seal, the gap between the uprights and the container (10) is sealed thereby reducing the airflow between containers (10) and the uprights. This would reduce the spread of fire across the system. In a further embodiment, fire resistant dry-wall panels may be used in a similar fashion to seal against uprights and floors, again reducing the airflow across the system and inhibiting any spread of fire.

It will be appreciated that a lack of oxygen in the atmosphere in a given area of the system may cause danger should maintenance be required by personnel. Use of gas sensors within the framework 14 will establish if the environment is safe to inspect.

The uprights 16 and the underside of the grid 14 may be provided with connectors for connection of the containers 10 or the stacks 12 of containers 10 to the framework 14. For example, provision of power, data, signals and services on the framework requires connection to the containers via suitable connections, if the services are to be utilised by the containers 10. Any suitable connection means may be used that can connect to a container or to which containers 10 can releasably connect. For example telescopic umbilicals may be used that can extend to connect the containers 10 to the grid.

The uprights 16 and the framework 14 may be provided with sensing means capable of identifying individual containers 10, stacks 12 of containers or objects contained within the containers 10. Sensing means may comprise barcodes on the containers 10 and barcode readers on the uprights, alternatively camera means may be utilised. Any suitable method of labelling individual containers and reading said labels may be used to achieve the same objective.

In use, the identification and the location of given containers 10 by sensing means on the framework 14 enables the system to establish the identity, and hence contents, of individual containers adjacent to sensors, connectors and service means. In this way individual containers 10 may be controlled, monitored or treated by means provided on the framework 14 of the grid. For example said sensor and controlling means may control the temperature in individual containers 10; control the level of nutrients applied to the content of individual containers 10; communicate with the content of individual containers 10; and transmit data via the content of individual containers 10. Advantageously, such sensor and communication means located within the containers 10 and the framework will enable the detection of fire and identification of the area within the storage system requiring fire suppression.

It will be appreciated that due to the presence of the load handling devices 30 on the grid 22 that the services provided within the framework 14 via the uprights may need to be routed from the base of the storage system.

It will be appreciated that in all aspects of the invention, the services provided on the framework 14 are not limited to those specifically described and that and service that may be routed via the uprights and the underside of the grid 22 may be installed.

It will be appreciated that depending on the services required within the storage system or provided in individual bins, aspects of the storage system may be controlled or monitored for data relating to the contents of the bins to be relayed to a central processing system. Furthermore, services and conditions within the containers or bins may be controlled, for example temperature, moisture, lighting or other parameters via control or monitoring means supplied via the uprights of the frame system. Control functions may be provided either by a local control system in the bin or by a central system sending signals to actuators in the bins via the uprights. Data transmitted may provide information on the condition of the bins, the contents of the bins or may provide information on the condition of the storage system in the vicinity of a given upright. Furthermore, in this way, the bins may be heated or cooled as required by the specific contents of the bin.

Moreover, the embodiments described above and detailed in the accompanying figures assume that the storage system comprises containers 10 in stacks 12 disposed within a framework 14 in an unfettered manner.

Furthermore, it will be appreciated that there are many combinations and permutations of compartmentalisation of system that may be used either as standalone fire prevention or fire suppression systems or methods.

Atmospheric Fire Suppression

Additionally, there are many ways of changing the atmosphere in and around the storage system such that should any fire break out the ability for it to spread is much reduced. Again the combinations of atmospheric selection together with partitioning systems and methods may be used in many combinations.

It will be appreciated that a reduction of oxygen by volume in the volume of the storage system would inhibit the spread of fire. Consider the effectiveness of reducing the oxygen content (to 13.4% by volume for example) and enhancing the nitrogen content (to 85.5% for example) of the atmosphere around the storage system. This could be done by extracting nitrogen from the air outside the building comprising the storage system. Commercially available systems exist and it will be appreciated that a combination of such systems with the storage system described herein would provide improved fire safety in large grid based systems.

Whilst 15% to 13% oxygen is safe for fit and healthy maintenance staff (consider for example, 2,700 m altitude is 15% oxygen by volume, 3,850 m is 13% oxygen by volume) it will be appreciated that creating a separate atmosphere around the storage system would reduce the risk of fire. In this way, it will be appreciated that a separate atmosphere would be required from the work areas to improve production worker comfort. Other areas of the building comprising the storage system could leak nitrogen enriched air through their ports. This would be compensated for by extracting nitrogen from the air outside the CFC. The advantage of such a system is no production workers would be required to perform their duties in significantly reduced oxygen levels.

Furthermore, in a further aspect of the invention, there is provided a system where the oxygen content of the volume of the building comprising the storage system is controllable, and on detection of an incident the nitrogen content in the volume is increased once personnel are evacuated so as to extinguish a fire.

Container Design and Selection

UK Patent Publication No GB2547783 A1 discloses a storage system in which the container 10 used in the storage system described above is provided with a liner 50. The liner 50 is formed from a suitable material such as metal or a flame retardant plastics material. A metal liner 50 may be formed from aluminium or aluminium alloys or from mild steel or any other suitable metal. A flame retardant plastics liner 50 may be formed from PVC or a glass loaded polymer with suitable flame retardant properties. It will be appreciated that these are examples only and that the liner 50 may be formed from any suitable flame retardant material.

The liner 50 is formed so as to conform to the inner surface of the container 10. The liner 50 is formed so as to be removable from the container 10 either manually or robotically. The liner 50 is shaped such that the ability of the containers 10 to be stacked is not inhibited.

In this way, containers 10 comprising liners 50 may be stored in the storage system described above with reference to FIGS. 1 to 4. Accordingly when inflammable items 28 are required to be stored in the storage system, a container 10 having a liner 50 may be used.

Preferably, any container 10 comprising a liner 50 and an inflammable product or products 28 is stored in a position within a stack 12 such that there is a further container 10 above the lined container 10, the base of the container 10 immediately above the lined container forming a lid over the inflammable items 28 held within the liner 50 in the container 10.

When inflammable items 28 for storage in the system are received at the input of the storage system (not shown), the items 28 are loaded in to a container 10 comprising a liner 50. This loading may occur manually or robotically. Alternatively, a load handling device 30 may act to collect a container 10 comprising a liner 50 from the one of the stacks 12 of the storage system. Such a stored, lined container, which may already contain inflammable items 28 of the same or different type as those to be stored in the system, or which may be empty, is transported to an appropriate goods inward of the storage system and the products 28 placed in the lined container.

After the items 28 are placed in the liner 50 in the container 10, a load handling device 30 transports the loaded container 10 to an appropriate position and places the container 10 in a stack 12 within the storage system.

When a customer order requires an inflammable product 28, the container 10 comprising the liner 50 is removed from the relevant stack 12 and transported to a pick station (not shown) where the requisite item or items 28 are removed from the container and added to the customer order. The customer order may include one or more inflammable items and may include further items such as fresh produce or other non-food items. The customer order is preferably packed in to a delivery container in preparation for onward transmission to a delivery vehicle for delivery to the customer. The order packing may be manual or automatic and may occur on the grid or at a pick station (not shown). The delivery container may comprise a container comprising bags, boxes or further liners or any other suitable delivery packaging. The delivery container may be temporarily returned to the storage system to await onward transmission to a delivery vehicle.

In another method of picking inflammable items 28 from the storage system, a load handling device 30 may collect a container 10 comprising inflammable items and transport it to a first pick station for a first item 28 to be removed and added to a customer order. A load handling device 30 may then transport the same container 10 to a further pick station (not shown) to fulfil a further customer order and this may continue until such a time that the container 10 comprising the liner 50 no longer comprises any inflammable items 28 or until no further customer orders require inflammable or ignitable items 28 from the given container 10.

It will be appreciated that if the container 10 no longer contains inflammable or ignitable item then it may be returned to the goods inward portion of the storage system for refilling or it may be returned in to a stack 12 until it is required. Furthermore, it will be appreciated that the liner 50 may be removed at an appropriate position on the grid and the container 10 used to store products and items not requiring a liner 50.

It will be appreciated that in any given storage system there may be a number of containers 10 comprising liners 50 that are used to store ignitable or inflammable products 28. Furthermore, multiples of the same product 28 may be stored in a given lined container 10. Alternatively, a plurality of different products 28 may be stored in a given lined container 10. In a further form of the invention, a container 10 may comprise two or more liners 50 acting so as to sub-divide the container in to two or more separate portions thereby enabling different products 28 to be separated within a single container 10.

It will further be appreciated that multiple containers 10 comprising liners 50 may be stacked in a given stack 12, a single stack 12 may comprise only containers 10 comprising liners 50, a plurality of stacks 12 may comprise only one lined container and some stacks 12 may not comprise any lined containers.

Furthermore, the liner means 50 described above are removable from the containers 10. However, it will be appreciated that the liner means may be fixedly attached to the interior surface of the container 10 or the liner means 50 may comprise a coating on the internal surface of the container 10.

It is a problem with known systems using liners in containers 10 that as described above, containers 10, comprising liners 50 have only been used to contain inventory items 28 that may be considered a fire risk. However, it will be appreciated that containers 10 comprising liners 50 may be used to store inventory items 28 per se. Advantageously, using containers 10 comprising liners 50 throughout the storage system may prevent the spread of fire or enable any fire to be contained to a section of the storage system that could then be partitioned as described above for the fire to be extinguished.

In the case where inventory items 28 that are not considered a fire risk, for example foodstuffs, are stored in lined containers 10, it may be necessary to ensure the and each liner 50 is treated to permit use with foodstuffs if said liner is formed from a material not considered safe with foodstuffs.

It will be appreciated that a liner 50 may further comprise any suitable material such as metal, composite or any suitable fire resistant but food safe material. In the case of a liner formed from steel, this would enable all containers 10 to be formed from fire retardant materials as the steel liner 50 would be considered foodstuff safe.

It will be appreciated that any combination of fire retardant container 10 with steel liner 50, container 10 with a fire retardant liner 50 coated with foodstuff safe material and fire retardant container 10 comprising inventory items 28 considered not to be a fire risk may be envisaged and the storage system need not comprise only one combination of container 10 and liner 50.

In a further aspect of the invention, the storage system 10 comprises containers 10 formed from metal. The metal may comprise, for example, steel or any other metal suitable to form in to a container 10 and capable of stacking as required in the storage system.

In a further aspect of the invention, the container (10) may comprise a food safe fire retardant material.

As shown in FIGS. 11a and 11b, in a further aspect of the invention, the storage system may comprise at least one container 10 formed with an external frame 110 and a storage portion 120. The external frame 110 comprises supporting uprights 130 linked by structural members 140 to form a box-like frame. The frame 110 acts so as to support the storage portion 120.

The external frame may be formed from any material suitable for supporting storage portion. This may include but not be limited to fire retardant plastics material, metal, metal composites. The function of the frame in the present embodiment is to support the storage portion 120 and prevent buckling of the storage portion 120.

The storage portion 120 may be formed from any suitable structural material such as pressed metal, for example aluminium or steel. The storage portion 120 of the container may be formed from any suitable fire retardant plastics material.

In the first embodiment of the composite container 10, the frame 110 is formed from plastics material and the storage portion 120 is formed from thin sheet metal. In this embodiment, the storage portion 120 may form the structural component of the container 10. In use, in a stack 12, in the event of a fire, whilst the plastics material forming the frame portion 110 may melt or deform, the storage portion 120 would maintain its structural integrity long enough for the firm to be contained. In the event the plastics frame were to completely melt away, the stack of storage portions 120 would self seal and prevent the inventory content therein from forming fuel for the fire. This would inhibit the spread of the fire around the system. As shown in FIGS. 13a and 13b, the composite container may further comprise a lid 200.

In a second embodiment of the structurally composite container 10 the frame of the container 10 comprises plastics material and the walls of the container 10 comprise thin sheet material 180, for example metal walls 0.3 mm steel, reinforced where required with fibres so as to improve, for example the buckling resistance.

It will be appreciated that the fibres may comprise carbon fibre, glass fibre, Dyneema™, Siveras™ or any fibres capable of providing the required structural properties for the container 10.

The base 180 of the container 10 may also comprise sheet material 180 such as steel, again reinforced so as to prevent deformation when loaded with inventory items 28.

In a third embodiment of the invention as shown in FIGS. 12a and 12b, the frame portion 110 of the container comprises plastics material and the walls comprise a mesh structure 190 clipped or mechanically secured in to the frame 110. It will be appreciated that the mesh structure need not comprise all of the area of the sides, a portion adjacent the base together with the base 180 may remain solid to retain any spillages.

In a fourth embodiment, the container 10 may comprise folded sheet material 180, for example metal such as steel, with welded sides, supported as required by composite tapes and structural webs or halos as described above. Alternatively, the container 10 may comprise sheet metal 180 pressed or formed using suitable pressing techniques, as shown in FIG. 14.

In all of the above examples, the amount of plastics material forming the container 10 has been significantly reduced whilst retaining the structural integrity of the container 10 but maintaining a reduction in weight of the container 10 compared with a conventional container 10. The reduction in plastics material will reduce the likelihood of fire spreading through the storage system.

It will be appreciated that in any of the embodiments above, the portion of the container 10 that would be required to interact with the load handling device, such as the top frame that co-operates with the gripper assembly of the load handling device 30, may be formed from suitable plastics material (150 in FIGS. 11b and 12b and 13a). Said top frame 150 would also act so as to form a surface having a width sufficient to enable containers 10 to stack.

In all of the above embodiments, in order to provide the required structural characteristics, it may be necessary to provide the container 10 with a circumferential halo (not shown in any embodiment) to support the container 10 sides so as to prevent, for example buckling. It will be appreciated that a bottom rim 160 may also be provided, again formed from plastics materials.

It will be appreciated that such a container 10 has improved fire resistance. Prior art containers formed from metal have improved fire resistance in the past but have been too heavy for the present application. Use of structural composites utilising sheet materials and supporting tapes and ribs enable the containers to be lighter whilst retaining structural integrity. Additionally, such composite containers 10 may are cheaper by virtue of the reduced amount of material needed to form the container 10.

Additionally, the use of plastics material to form the framework, and metal to form the storage portion ensures that no plastics contaminant comes in to contact with any foodstuffs whilst reducing the likelihood of fire spreading within the containers 10.

Additionally, in the event of a fire, even if the plastics framework would eventually disintegrate, the then metal boxes would remain in a stacked form and even in the event of buckling, the inventory items 28 contained therein would be much less likely to catch fire themselves thereby not acting as fuel to any fire.

It will be appreciated that any plastic or composite material required may be a flame retardant formulation.

It will be appreciated that any sheet material used may comprise holes stamped in the sheet material, or it could be left as plain sheet if airflow is not required, further hindering a fire from spreading.

In order to form such a structurally composite container 10 means for attaching plastic to metal may be via adhesive although welds or mechanical fixtures may be used. A further attachment mechanism that may be envisage comprises the double rim method by which the tips of aluminium cans are sealed, or any variation of that method.

It will be appreciated that the containers may comprise cooperating interlocking means so as to enable containers 10 to stack. However, it will further be appreciated that this need not be the case if the containers 10 stack in a confined manner.

It will be appreciated that the use of a structural composite container 10 enables the containers 10 to be flat packed hence improving the storage and shipping of the containers 10 for assembly on site.

Moreover, the embodiments described above and detailed in the accompanying figures assume that the storage system comprises containers 10 in stacks 12 disposed within a framework 14 in an unfettered manner. It will be appreciated that the system may be partitioned by suitable partitioning means into smaller sub sections for example for safety reasons.

Fire Suppression by Container Arrangement

In a further aspect of the invention, there is provided a storage system having rows of stacks of containers 10 removed to provide a fire break 170. This is particularly useful in a very large system comprising many hundreds of thousands of containers 10. It will be appreciated that using such a fire break 170 arrangement of containers 10 will only reduce the density of the storage system by a small amount whilst preventing fire across any containers 10 or stacks 12 of containers 10 spreading. Advantageously, missing rows of stacks 12 of containers 10 would also provide access to the dense storage system in the event of an incident. The firebreak essentially partitions the storage system by removing material from the system. The firebreak may comprise a single aisle of stacks 12 of containers 10, however, it will be appreciated that any number of adjacent aisles may be formed in the storage system depending on the fire risk associated with the inventory items to be stored.

In a further aspect of the invention, a control system is provided acting on the load handling devices, the control system acting so as to instruct the load handling devices to remove stacks 12 of containers 10 in the event of an incident. In this way, once a fire is detected the load handling devices 30 act in concert so as to remove sections of storage adjacent any incident so as to prevent the spread of any fire and to enable access to the storage system. The control system may be provided with a pre-prepared script to be run to be communicated to the load handling devices 30 in the event an incident is detected.

In a further aspect of the invention, the containers 10 in the storage system are arranged in rows or aisles of stacks 12 of containers 10 comprising liners 50. In this way, the storage system is self-partitioned so as to create sections of storage containers 10 ring fenced by containers 10 comprising liners 50. It will be appreciated that the control system acting on the load handling devices 30 may be programmed to ensure certain lined containers 10 were always positioned in certain places, irrespective of the inventory items 28 contained in the containers 10.

In a further aspect of the invention, the containers 10 may comprise inventory items 28 acting so as to block airflow throughout the storage system. Again, the positioning and location of containers 10 comprising such airflow blocking inventory items 28 may be controlled by the control system, said control system ensuring that such containers 10 are located so as to compartmentalise the storage system.

The partitioning of the storage system in this way enables containers 10 comprising inflammable or ignitable items to be stored separately from containers 10 comprising other items, products or goods.

Physical Fire Suppression

As shown in FIG. 15, the system may further comprise physical fire suppression means 210. FIG. 15a shows a system adapted to starve any fire within the stacks 12 of containers 10 of oxygen. The system comprises a fireproof flexible material or blanket 210 deployable over the top of the stacks 12 of containers 10. The blanket 210 acts so as to contain the fire within the storage system and prevents the heat from any fire spreading to structural components of the building in which the system is located. The blanket 210 may be stored adjacent the system and only deployed as necessary. In one form the blanket 210 may be mounted on a roller.

In use, the blanket 210 may be deployed in response to a signal from the control system. The blanket 210 may be for example, pulled across the storage system by a system of preinstalled wires 220 acted on by a series of motors to pull the wires 220 across the system.

In this embodiment of the invention, the control system of the storage system would need to communicate an instruction to the load handling devices 30 to be removed from the area above the system where the blanket was to be deployed.

In an alternative embodiment of this aspect of the invention, the load handling devices 30 may be used to deploy the blanket, again requiring instruction by the control system.

It will be appreciated that moveable portions of the blanket may be provided to allow management of heat beneath the blanket if required by fire personnel.

Fire Mitigation Actions

In a final aspect of the invention, a storage system is provided where the system itself acts so as to mitigate any losses. In known systems in the event of a fire, a safety stop is activated and the robotic load handling and storage system will be stopped and the building evacuated.

Given that in many cases such large systems are automated and a detected fire may only be in a small portion of the system, a series of scripts could be remotely activated to mitigate loss. In one embodiment of this aspect of the invention, this may for example include instructions to be communicated to the load handling devices to remove any containers comprising inventory items 28 to be swiftly moved away from the vicinity of the fire and output from the system.

In an additional embodiment, the load handling devices 30 may be instructed to remove containers 10 from the storage system to create routes through the storage columns so as to enable access by qualified personnel as appropriate.

Alternative forms of load handling device may be used to further mitigate loss of inventory items 28. For example in one aspect of the invention, a load handling device 30 is provided with a Z direction hoist and device and sufficient racking to store a complete column of totes. This would allow trained engineers to quickly examine the entire stack.

In a further example of load handling device 30 use, load handling devices may be equipped with fire-fighting capability such that a small fire in a limited number of totes could be extinguished.

Advantageously, this would not require any infrastructure to be powered, whereas similar strategies that rely on using the system in automatic mode require the load handling devices 30 to be powered and the storage system not to be emergency stopped Manual hoists may be provided to enable load handler operation in X, Y and Z directions. If used in association with the embodiment described above with reference to the blanket deployment, storage would not be needed, but safe containers could be manually removed to the edge of the system, or dropped in empty locations remote from any fire.

This would require a 3-stage approach:
First use load handling devices 30 under instruction of the control system to isolate the fire to limited number of containers radius around the incident;
Second, use a manually operate load handling device to fight the fire and remove more bins manually; and
Third, once the fire is "under control", deploy multiple simple (inexpensive) manual bin hoists to clear out as many bins as possible as fast as possible.

In a further embodiment of this aspect of the invention the manually powered load handling device further comprises tooling such that sections of the grid and framework may be manually removed to provide additional access to the storage system as required.

It will be appreciated to a person skilled in the art that there are many different systems and methods of fire detection, fire suppression and fire extinguishing. Furthermore, it will be appreciated that any combination of the system, apparatus or method of fire prevention, fire detection, fire suppression, and fire extinguishing described above may be used and that all, any or any combination of the apparatus, systems and methods described may be incorporated in to a system described herein.

It will be appreciated that whilst the systems, apparatus and method of fire prevention are described with reference to a robotic picking and storage system in an online retail environment, such systems, apparatus and methods may equally be applied and incorporated in any combination in to systems of the type described but for use in, for example, vertical farming, car parking, parcel sortation, reconfigurable buildings, shipping and container ports although many other uses may be envisaged.

Equally, such systems, apparatus and methods described above may be incorporated in to any form of storage system, robotic or otherwise.

Many variations and modifications not explicitly described above are also possible without departing from the scope of the invention as defined in the appended claims.

The invention claimed is:

1. A storage system, comprising:
   containers stacked in stacks within a framework structure having uprights, the framework structure including:
      a plurality of upright members arranged to form a plurality of vertical storage locations for one or more containers to be stacked between the upright members and be guided by the upright members in a vertical direction, the plurality of upright members being interconnected at their top ends by a first set of tracks extending in a first direction and a second set of tracks extending in a second direction;
   the second set of tracks running transversely of the first set of grid members in a substantially horizontal plane to form a grid structure having a plurality of grid cells;
   the storage system comprising:
      containers located in stacks in the vertical storage locations, wherein the containers located in the stacks are spaced from the upright members of a corresponding vertical storage location such that a gap is formed between the containers located in the stack and the upright members; and
      the upright members comprising:
         intumescent seals configured and arranged such that an increase in temperature in a container within the storage system will cause said seals to expand and seal the gap between the upright members and the container thereby reducing the airflow between the container and the upright members.

2. A storage system, comprising:
   rows or aisles of containers stacked on top of one another in stacks within a framework structure having uprights, the framework structure including:
      a plurality of upright members arranged to form a plurality of vertical storage locations for one or more containers to be stacked on top of one another between the upright members and be guided by the upright members in a vertical direction, the plurality of upright members being interconnected at their top ends by a first set of tracks extending in a first direction and a second set of tracks extending in a second direction;
   the second set of tracks running transversely of the first set of tracks in a substantially horizontal plane to form a grid structure having a plurality of grid cells,
   wherein each vertical storage location in a row or aisle of the framework is configured to be accessed from the top ends of the plurality of upright members through a corresponding grid cell of the plurality of grid cells so that one or more containers can be deposited to or retrieved from the vertical storage location,
   the storage system comprising:
      containers located in stacks in the vertical storage locations; in which a portion of the storage locations do not include containers, said arrangement of said portion of locations being arranged so as to form breaks in the storage system, wherein the stacks of containers are arranged in rows, and wherein the breaks in the storage system are formed from missing rows of stacks of containers.

3. A storage system according to claim 2, wherein the containers include a skeleton portion and a storage portion, the skeleton portion including supporting uprights linked by structural members to form a box-like frame, the skeleton portion and the storage portion cooperating so as to form a structurally composite container.

4. A storage system according to claim 3, wherein the skeleton portion is formed at least in part of plastics material.

5. A storage system according to claim 3, wherein the skeleton portion is formed at least in part of metal.

6. A storage system according to claim 5, wherein the storage portion includes sheet metal.

7. A storage system according to claim 2, wherein the storage portion includes sheet metal.

8. A storage system according to claim 2, wherein the containers are formed from a fire-retardant material.

9. A storage system according to claim 8, wherein the containers are formed from metal.

10. A storage system according to claim 2, wherein the containers are formed from metal.

11. A storage system according to claim 8, wherein the containers are formed from a fire-retardant plastic.

12. A storage system according to claim 2, wherein the containers are formed from a fire-retardant plastic.

13. A storage system according to claim 12, wherein the containers comprise liners.

14. A storage system according to claim 2, wherein the containers comprise liners.

15. A storage system according to claim 14, wherein the liners comprise a food safe material.

16. A storage system according to claim 14, wherein the liners are formed from steel.

17. A storage system according to claim 2, wherein the containers are arranged within the vertical storage locations according to the structural makeup of the container.

18. A storage system according to claim 2, comprising:
   plural containers including customers orders stored in customer delivery containers of the plural container, inventory items stored in inventory containers of the plural containers, and empty storage containers of the plural containers.

19. A storage system according to claim 2, comprising:
deployable physical fire suppression means, said physical fire suppression means being configured and arranged to deploy on to an uppermost surface of the storage system to deprive a fire of oxygen.

20. A storage system according to claim 19, wherein the physical fire suppression means includes a fire blanket.

\* \* \* \* \*